(12) United States Patent
Liu et al.

(10) Patent No.: US 8,786,407 B2
(45) Date of Patent: Jul. 22, 2014

(54) UNIVERSAL AND REUSABLE RFID SYSTEM AND METHOD FOR USE IN SUPPLY CHAIN AND LOGISTICS MANAGEMENT

(76) Inventors: Xue Wu Liu, Bloomington, CA (US); Rui Li, Bloomington, CA (US)

( * ) Notice: Subject to any disclaimer, the term of this patent is extended or adjusted under 35 U.S.C. 154(b) by 427 days.

(21) Appl. No.: 13/208,284

(22) Filed: Aug. 11, 2011

(65) Prior Publication Data

US 2012/0075071 A1  Mar. 29, 2012

Related U.S. Application Data

(63) Continuation of application No. 12/728,243, filed on Mar. 21, 2010, now Pat. No. 8,505,469.

(60) Provisional application No. 61/373,815, filed on Aug. 14, 2010.

(30) Foreign Application Priority Data

Sep. 14, 2009  (CN) .......................... 2009 1 0177769

(51) Int. Cl.
  *G06K 7/01*  (2006.01)
(52) U.S. Cl.
  USPC ...................... 340/10.1; 340/10.5; 340/10.51
(58) Field of Classification Search
  USPC ............... 340/10.1, 10.2, 10.3, 10.31, 10.33, 340/10.34, 10.4, 10.41, 10.42, 10.5, 10.51, 340/10.52, 572.1
  See application file for complete search history.

(56) References Cited

U.S. PATENT DOCUMENTS

| | | |
|---|---|---|
| 3,713,148 A | 1/1973 | Cardullo et al. |
| 7,092,943 B2 | 8/2006 | Roese et al. |
| 7,161,489 B2 | 1/2007 | Sullivan et al. |
| 7,492,267 B2 | 2/2009 | Bilyeu et al. |
| 7,570,165 B2 | 8/2009 | Albraham, Jr. et al. |
| 7,576,651 B2 | 8/2009 | Jin et al. |
| 7,928,965 B2 | 4/2011 | Rosenblatt et al. |
| 2006/0087406 A1* | 4/2006 | Willins et al. ................. 340/10.3 |
| 2006/0197651 A1* | 9/2006 | Lee et al. ..................... 340/5.61 |
| 2009/0207001 A1* | 8/2009 | Masin et al. ............... 340/10.41 |
| 2010/0085160 A1* | 4/2010 | Fu ................................ 340/10.1 |

* cited by examiner

Primary Examiner — Nabil Syed

(57) ABSTRACT

An universal and reusable RFID system comprises an universal and reusable RFID reader, an universal and reusable RFID data carrier, a universal and reusable RFID neutral tag, a RFID neutral tag equipped collapsible and reusable pallet and a RFID neutral tag equipped collapsible and reusable box. In various embodiments, the universal and reusable RFID system is used for data collection, data comparison, data confirmation and data combination under all conditions in the supply chain and logistics management. A "bank-like" system is further used for all components of the universal and reusable RFID system to be efficiently supplied for use and collected for further application.

20 Claims, 36 Drawing Sheets

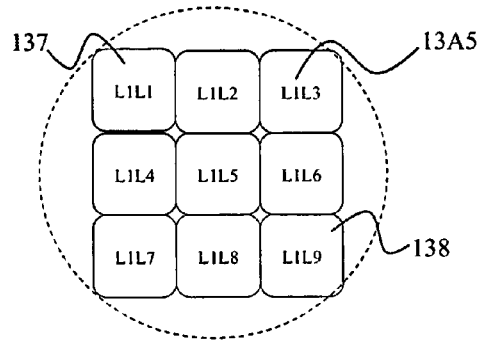
FIG. 13A1
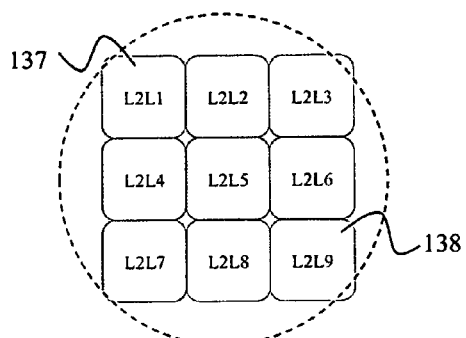
FIG. 13A2
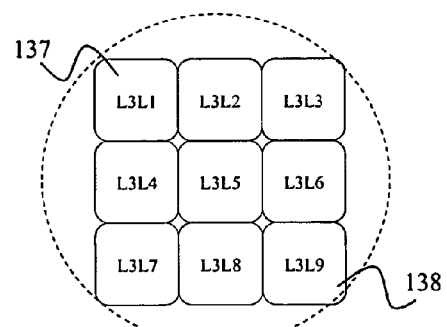
FIG. 13A3
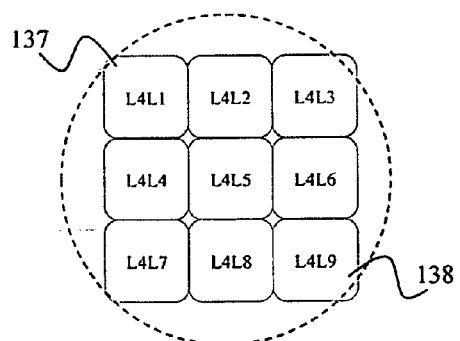
FIG. 13A4

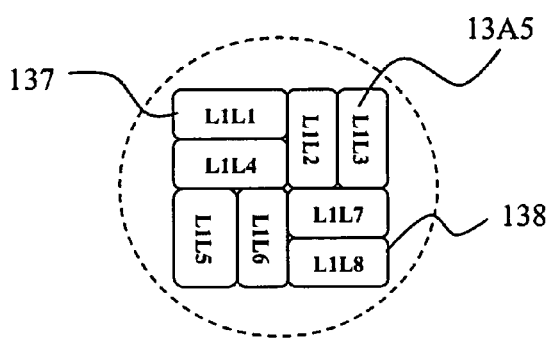
FIG. 13B1
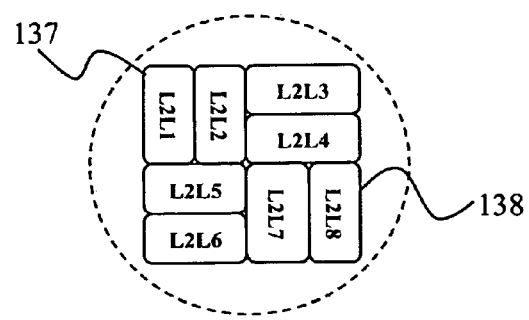
FIG. 13B2

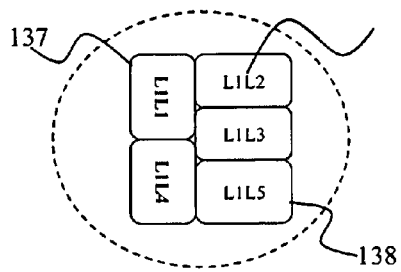
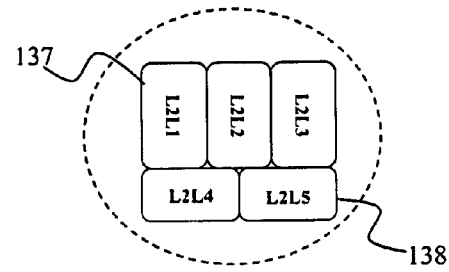
FIG. 13C1  FIG. 13C2
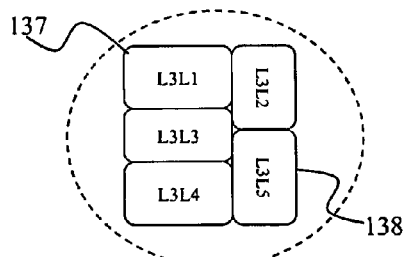
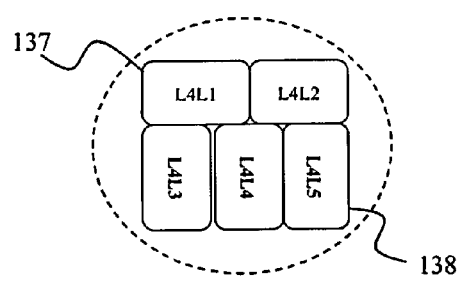
FIG. 13C3  FIG. 13C4

UNIVERSAL AND REUSABLE RFID SYSTEM AND METHOD FOR USE IN SUPPLY CHAIN AND LOGISTICS MANAGEMENT

PRIORITY FILING DATE

Applicant claims priority date of Aug. 14, 2010 based on Provisional Application No. 61/373,815.

CROSS REFERENCE TO RELATED APPLICATION AND PATENTS

The present application is continuous of the following U.S. patent application, U.S. patents and P.R. China patents: U.S. patent application Ser. No. 12/728,243 entitled "All in one multifunction pallet"; U.S. Pat. No. 7,255,239 B2 entitled "C & R container and method for use". P. R. China. Pat. Nos.: 200410032184.6, entitled "C & R container"; 200810099015.2, entitled "RFID tag equipped multifunction and reusable container" and 200910177769.X, entitled "A type of pallet", and the contents of which are incorporated by reference herein.

FIELD OF THE INVENTION

The present invention relates to a universal and reusable RFID system, including a universal and reusable RFID reader, a universal and reusable RFID data carrier, a neutral RFID tag for C & R pallet and a neutral RFID tag for C & R box, and the method to use the RFID system for supply chain and logistics management.

BACKGROUND OF THE INVENTION

Radio frequency identification (RFID) technology and RFID related knowledge have been widely used in the world, since the first true ancestor of modern RFID Patent (U.S. Pat. No. 3,713,148) to Cardullo, et al. in 1973 and the first patent associated with the abbreviation RFID was granted to Walton, et al. in 1983 (U.S. Pat. No. 4,384,288). Recent U.S. Pat. No. 7,928,965 to Rosenblatt, et al, a RFID chips in Apple's iOS devices that will enable such things as wireless transfers of data from an iPhone to a desktop with just a simple shaking motion or even allow a user to open up a keyless hotel or car door with a simple swipe.

Major retailers, Department of Defense and other industry have been working and are trying to apply RFID technology to their business and business management. As RFID strategy leader in Wal-Mart, Mr. Ron Moser, pointed out in the International RFID Applications Show (Taiwan) in October 2007, about 2 percent of all lost sales in Wal-Mart are due to the simple fact that a store having run out of such item, but 41 percent of lost sales are due to inventory problems. If RFID can fix just 10 percent of that problem, then Wal-Mart will gain $287 million per year by avoiding lost sales. Mr. Moser further expected UM to have a greater help on the company than barcode did when that technology was first introduced in 1984 (EXHIBITS, 1).

However, the current RFID technology application in various fields over the world is still limited by the following disadvantages of the present RFID technology:

a. The unique identification information of a RFID tag for specific item results that each RFID tag can be only used for one time for one specific product or one box or one pallet. There is no RFID standard enable a RFID tag to be reused again and again for various product. As described in ISO 17364 for RFID tag reusability: "Technologically all RFID tag are theoretically reusable. Because of the unique identification aspects of transport unit, the permanent nature of the physical attachment of the tag, and the low cost of the tags themselves, product level tags are generally not reused for commercial retail items, and commodity items".

b. The Radio Frequency (RF) for RFID systems currently in use is not the same over the world.

c. The whole RFID system won't work if there is no RFID reader available or RFID tags are unreadable.

d. Apparently, the overhead to set up RFID system is still high for many middle and small business companies. The various standards and systems in RFID technology require huge money to follow up.

e. The RFID technology application is largely limited by the fact that RFID technology currently can't provide 100% accuracy due to many reasons in practical application for inventory control as it should be theoretically.

f. Unrecoverable of a RFID tag data is another major problem for RFID technology application in supply chain and logistics management if a RFID tag is unreadable for any reason.

g. It is hard to locate the real location of a read RFID tag or an unread RFID tag within the reading range, except there is only one tag in the reading area.

h. The RFID technology has been referred to as an invasive technology.

i. There is no system combined with RFID technology to efficiently recover all reusable items for further application. Even though ISO and EPC have set up coding standard for Global Returnable Asset Identifier (GRAI) or Returnable Transport Item (RTI), such as pallets. All GRAI or RTI must be returned to their original owner's place for further application. The returnable item of a pallet, for example, even needs two RFID tags in the application as ISO 17365 described "One tag represents the unique RTI identification and the second represents the shipment unique identification".

Our previous patents, "C & R container" (U.S. Pat. No. 7,255,239 B2, P. R. China Pats.: 200410032184.6 and 200810099015.2) and "All in one multifunction pallet" (U.S. Pat. Appl. No. 12/728,243 and P. R. China Pat. No.: 200910177769.X), have described various ways to use C & R pallet and box to solve many problems related to product movement in the supply chain. For example, saving space when recollected by collapsing the used pallets and boxes, both pallet and box can be reusable as long as their functional well for product package and movement, any damaged part can be simply replaced with a new part and many other distinct features. However, novel structures and the most environment friendly characters do need to combine with the up-date technology, like RFID technology, to provide a much efficient way for all users to use both reusable boxes and pallets at the same or even cheaper price compared with the current box and pallet used in the supply chain, easy and convenient to collect each of all used box and pallet at nearby locations (EXHIBITS. 2, 3 and 4).

j. Containerization makes the modern supply chain and logistics more efficient, convenient, energy saving and less expensive compared with any other ways. The amounts of containers are increasing significantly in the worldwide. As the results, the empty container numbers are also rapidly increasing in North American and European countries. It has been estimated that there are about over 20% of total containers are left in these countries and regions each year, which is a serious problem for container owners and the environment. According to the report of U.S. Department of Transportation in 2008, all container ports in USA handled 28. 2 million loaded TEUs (Twenty foot equivalent units—an international measure for counting containers) in 2008. Of which there are about 6 million TEUs empty containers either left in various container storage locations in New York/ New Jersey, Los Angeles, Long beach, Chicago, and Dallas or shipped out as empty containers for further use. Only in port of Los Angeles handled about 1.9 million empty containers in 2008 and accounted for 51 percent of the total outbound export TEUs (EXHIBITS. 5).

k. All other problems related to RFID technology application in supply chain and logistics management have been well and professionally referenced by Abraham, Jr., et al. in their U.S. Pat. No. 7,570,165 and Sullivan, et al. in their U.S. Pat. No. 7,161,489 B2.

Accordingly, an integrated and functional well RFID system with a most simple method to use is really and surely needed for the supply chain and logistics management. The RFID system, based on the present international or various countries or regions regulations, and the method, according to the present product handling and operating process, can practically help all users in the supply chain and logistics management to achieve an efficient and effective result. The RFID system and its application methods to use can truly and really solve all addressed issues in above or potential existing issues in one or more aspects. The combination of C & R pallets and boxes with RFID technology enable both the pallets and the boxes to be tracked and monitored all time and to be collected efficiently and timely for further application. The combination of the RFID system with C & R pallets and boxes enable all involved users to share RFID technology at a very low cost. The RFID system and its application method allow all users to collect RFID tag data under the conditions that a RFID reader is unworkable or unavailable or some or all RFID tags are unreadable by a RFID reader. All collected data are allowed to be verified with more than one method to compare with the received product and data by using or without using a RFID reader or a barcode scanner.

SUMMARY OF THE INVENTION

One or more aspects of embodiments for the universal and reusable RFID system are to address above problems, unsolvable problems and/or disadvantages, particularly there is no RFID system compatible with the C & R pallet and box, and furthermore, there is no RFID tag can to be reused repeatedly with free of charge for all users when they use C & R pallets and box for their product movement and their business management in the supply chain. The present RFD system can be employed by manufacturers, retailers, Department of Defense, the end users and all related industries.

In one or more aspects of embodiments, the RFID reader can be used in all countries over the world to overcome the limitation of various mandatory RF in different countries and regions. The RFID reader uses real time location information to determine its real locality and further to select a legally open RF to work. The information module, supported by GPS or similar systems or by GSM or similar systems, enables the RFID reader to select a legal allowed working channel for RFID tag data collection.

In one or more aspects of embodiments, the combination of the real time location data of the RFID reader with all collected RFID tag data and product data makes all data collected via the RFID reader to be real time location data. The reading ability of the RFID reader is limited to only read RFID tags on each of C & R pallets and boxes to match with the pre-saved RFID tag data by the RFID system supplier. All pre-saved RFID tag data by the RFID system supplier can be used to set up a specialized "data filter" for each read RFID tag. Any unmatched and irrelevant RFID tag is not allowed to be read by the RFID reader and further no way to record or view those RFID tags surrounding in the environment near the RFID reader. This is not only to achieve RFID tag data collection to be 100% accuracy when combined with the speaker and the counter module, but also a way to protect all users' privacy from their irrelevant RFID tag tagged products, equipment and others.

In one or more aspects of embodiments, the RFID reader allows inputting the readable part of a neutral RFID tag data by the keyboard or voice or by a barcode scanner for any unreadable RFID tag. In case, the product receiver need a RFID reader for product and data verification, the RFID reader can be used as a data carrier to carry all collected data and further to be used to read RFID tags on the received products for verification and further for all used components of RFID system recollection. To create a RFD reader ID for each time using with real time, it allows RFID reader to be reused again and again with no limitation. The lifetime unique REID reader ID is a valuable data in supply chain management.

In one or more aspects of other embodiments, a RFID data carrier is used to carry all collected and combined RFID tag data, product data and product related information for each shipping container or trailer with real time and real time location ability. The RFID data carrier makes product data available at any time for data review, data download and data verification with received products and further to implement paperless, labeling-less and marker-less transaction in the whole supply chain and logistics management. The lifetime unique REID data carrier ID is an important data for data combination with each box, pallet, and shipping container and further enable to monitor, identify and track all transported and received products with or without a RFID reader under all conditions or circumstances.

In one or more aspects of embodiments, all data carried by a RFID data carrier are contrast able data related to products and to all components of RFID system for the receiver, for the RFID system supplier or for any other related parties. This will totally change the situation that there is no way to contrast the read or unread RFID tag data on each of all boxes on the C & R pallet or on the pallet. The REID data carrier ID, combined with all RFID tags in a shipping container, enables all RFID tag data carried by the RFID data carrier to be real time and real time location data. This will realize any individual RFID tag in a shipping container or in a product transporting and keeping unit (PTK) or on any individual box to have real time and real time location information all the time.

In one or more aspects of other embodiments, the neutral RFID tag consists of five unchangeable parts and can be read universally by various RFID readers. The neutral RFID tag (the first to the fifth part) for C & R pallet further will combine with real time to create a lifetime unique ID for the C & R pallet when each RFID tag is read and further is recorded by the RFID reader. A unchangeable (the first to the fifth part) neutral RFID tag for C & R box further will combine with the real time when the tag is read, with the real location where the C & R box is stacked onto the C & R pallet and with the real name and the real number in which the product(s) is packaged, to create a lifetime unique ID for each box. Both RFID tags, used for C & R pallet and box, are neutralized (the first to the fifth part) with no any relationship to the carried or packaged products. The data (the first to the fifth part) is a simple but a best way to protect product information.

In one or more aspects of other embodiments, the neutral RFID tag, conjugated with C & R pallet and box, can be reused as many times as desired. The combination of RFID tag with C & R pallet and box enables the neutral RFID tag can be used for free of charge for all users. The universal and reusable RFID system combined with reusable pallet and box provide an efficiently, conveniently and practically way for product package, transaction, used pallets and boxes recollection and further reapplication in the whole supply chain. The readable part (the third and the fourth parts) of a neutral RFID tag allows the tag data can be recovered at any condition for any reason via a keyboard, voice or a barcode scanner. Only the readable part (the third and fourth parts) data, not a whole RFID tag data, used for an unreadable RFID tag data recovery is another advantage for RFID technology application. This simplifies the operation to recover an unreadable RFID tag data to be easy and simple. Furthermore, this makes it possible and convenient to combine the RFID technology with the barcode technology.

In one or more aspects of some other embodiments, methods to use RFID system for the neutral RFID tag data collection, the neutral RFID tag data comparison, the neutral RFID tag data confirmation and the neutral RFID tag data combination in the original place during palletization and containerization are easy to reach 100% accuracy for product movement in the whole supply chain at low and reasonable cost. That each of all tags must be read (by using a RFID reader or a barcode scanner or input by a keyboard or via voice), compared and confirmed singly for data collection is the key point to reach 100% accuracy for both the products and components of the RFID system during the palletization and containerization.

In one or more aspects of some other embodiments, a product transporting and keeping unit (PTK), set up through the data collection, data comparison, data confirmation and data combination in the original place, can be used as a universal reliable, universal acceptable, universal tracking able and universal verifiable unit for product transporting and keeping in the whole supply chain. All data related to a product transporting and keeping unit (PTK) can be readable, comparable and confirmable with more than one options under all conditions or circumstances. Data verification, only a fewer tags (≥1) being read randomly, is a super-advantage in RFID technology application. All data collected via the present invention can implement 3-dimension, multi-dimension, real time and real time location data for inventory control in supply chain management.

In one or more aspects of other embodiments, by applying the present RFID system, all conducts and operations related to product transactions and transfers are at least three parties involved. All data and products are kept transparent and accurate from beginning to the end. All data can be tracked from the beginning to the end, or in between of a product transaction or reversed from the end to the beginning with no limitation. The most distinct character is that the present RFID system enables and allows data collection and verification to be performed under various conditions with whole RFID system (computer, RFID reader and RFID tags) or partial RFID system (computer) or even no computer at all. All collected and established data are capable and ready to be used for any available RFID system or supply chain management system.

In one or more aspects of some other embodiments, using a bank-like system to supply and recover all components of the RFID system will be an efficient way for further reapplication of the present system to move product to market continually and efficiently. The RFID system supplier, as a professional, independent and neutral enterprise, can provide not only the components of the RFID system for product movement, also provides RFID technique support to guarantee each component and the whole system to work. The RFID system supplier is an example for RFID technology application for inventory control and business management.

In one or more aspects of some other embodiments, it is obvious that the application of the present universal and reusable RFID system will materially enhance the quality of environment, will materially contribute to the conservation energy resources and furthermore will materially contribute to countering terrorism and counterfeit products.

DETAILED DESCRIPTION OF THE INVENTION

It should be understandable and appreciated that the detailed description of the invention described below is not a limitation for the present invention application in all fields beyond the given figures, methods and explanations. The inventive concepts, methods and designs may be or can be expressed in other similar or specific contexts. The detailed and specific descriptions are not the further limitation for the scope of the present invention and application.

Currently, the RFID technology application requires the whole supply chain equipped with RFID system. Any single loop or partial loops in the whole supply chain without the RFID system, the RFID technology in the supply chain application will be obstructed and encountered difficulty, which is the one of the bottlenecks in RFID technology application for supply chain and logistics management. The methods for data collection, data comparison, data confirmation and data combination described in the present invention can be used at any stage for all product transactions and product data transfer. The emphasis of the importance for RFID data collection in the original place doesn't and won't limit the present invention for RFID technology application in any or all loops in the supply chain, since most business transaction points are the business ending point and the further business starting point. The specific terms used and descriptions discussed are merely to explain how to use the invention with no limitation of the scope of the present invention.

It is important to clarify that the present invention is not controversial with RFID EPC or ISO or UID or any other RFID standards for product at an item level identification, The present invention focuses on the C & R box and the C & R pallet level identification for product transporting and keeping, further allows all collapsible pallets and boxes to be reusable more efficiently with the help of the universal, reusable and neutral RFID tags. The present invention has no intend to against or attempt to replace the current RFID EPC or ISO or any other system for product at an item level identification. The present invention is fully aimed at the replenishment and perfection of the RFID technology applied to the supply chain and logistics management effectively and efficiently.

Figure 1:
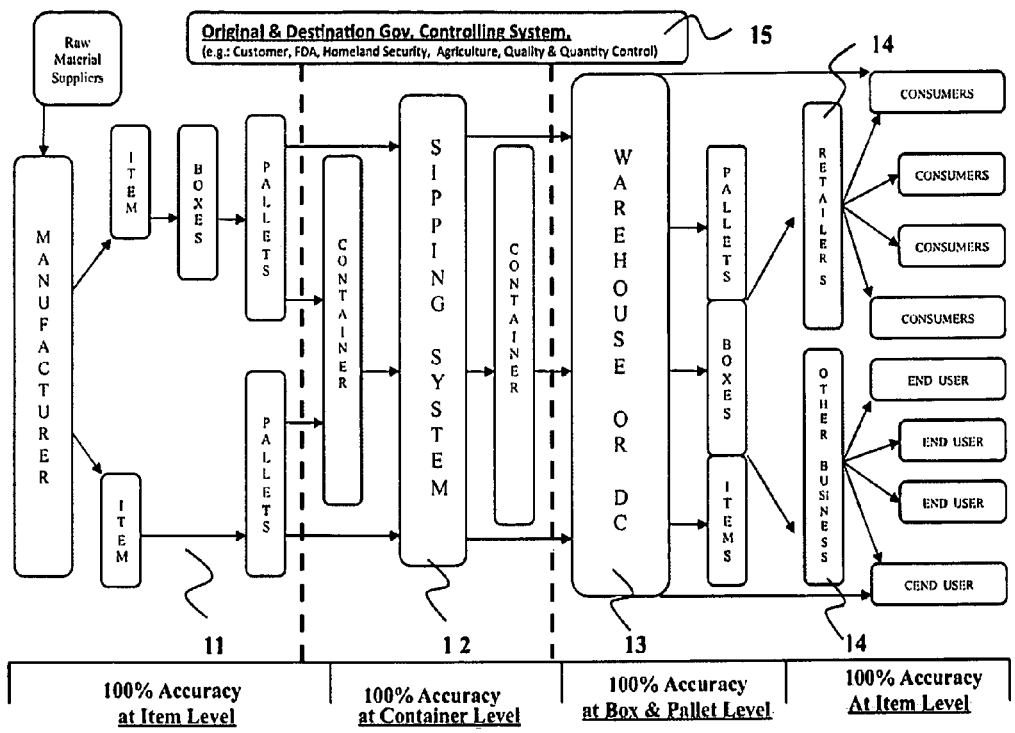
FIG. 1 shows the product transaction from the manufacturer to the end user at 100% accuracy with different levels.

FIG. 1 shows the product transaction from the manufacturer to the retailer or the end user at 100% accuracy with different levels.

The manufacturer 11 singly handles and processes the final products from raw materials. No matter to move their product to the market by items or in a box or aggressively unitized on the C & R pallet or finally loaded to a container, the manufacturers care the 100% accuracy at an item level for their cardinally and primarily interests of their profits.

By contrast, the marine shipping system 12 is focusing on the 100% accuracy at the sealed or locked shipping container level, no matter there is one or more than one products in a shipping container. The delivered products or merchandises are mainly received at the level of the shipping containers or trailer in the warehouse 13. All received products or reshipped products are handled, controlled and moved mainly at a pallet and box level inside the warehouse, distribution center or third party logistics or any similar facility 13. Though the item is the key data for inventory control, the practically handling and moving in a warehouse are mainly at boxes and pallets. All products or goods being sold in the store 14 or being used in the end user 14 are at an item level with 100% accuracy. All operations, involved in the manufacturer 11, the shipping system 12, the warehouse 13 and the retailers or the end users 14, are under the supervision of the government control system 15.

The manufacturer and the retailer or the end user, in fact, are working in the exact same way but different directions to handle each item, which will be a help and hint to understand the present invention.

Figure 2:
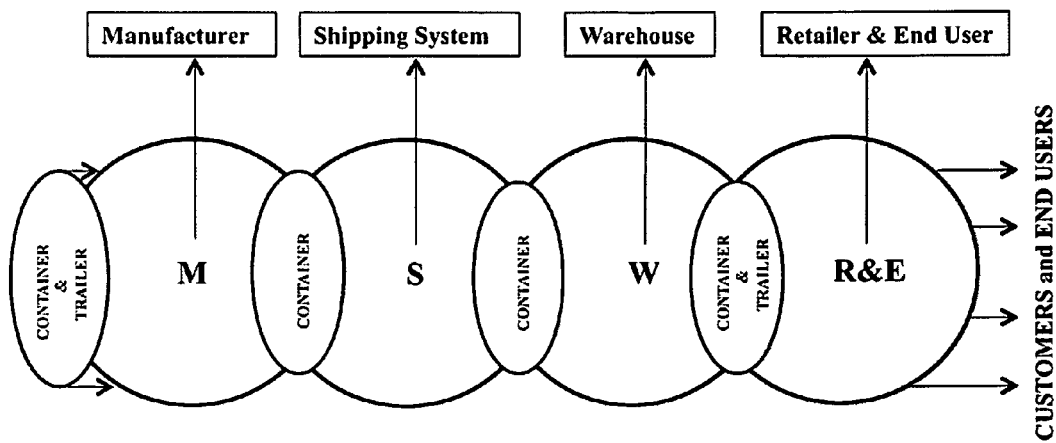
FIG. 2 shows each closed loop is linked by sealed or locked containerization or similar shipping method in the supply chain.

FIG. 2 shows each closed loop is linked by sealed or locked shipping container or trailer or similar shipping method in the supply chain and logistics. The sealed shipping containers or trailers are clearly indemnified both the safe of the shipped product and unchangeable position of each C & R box on the built pallet during the transportation All products are transferred from each closed facility via closed or sealed or locked shipping system as showed in the overlap area of the linked loops to the receivers or the end users in the supply chain.

The closed and locked shipping system in present supply chain can keep all delivered products and product data as it was. This is a point for a better understanding the present invention.

Figure 3:
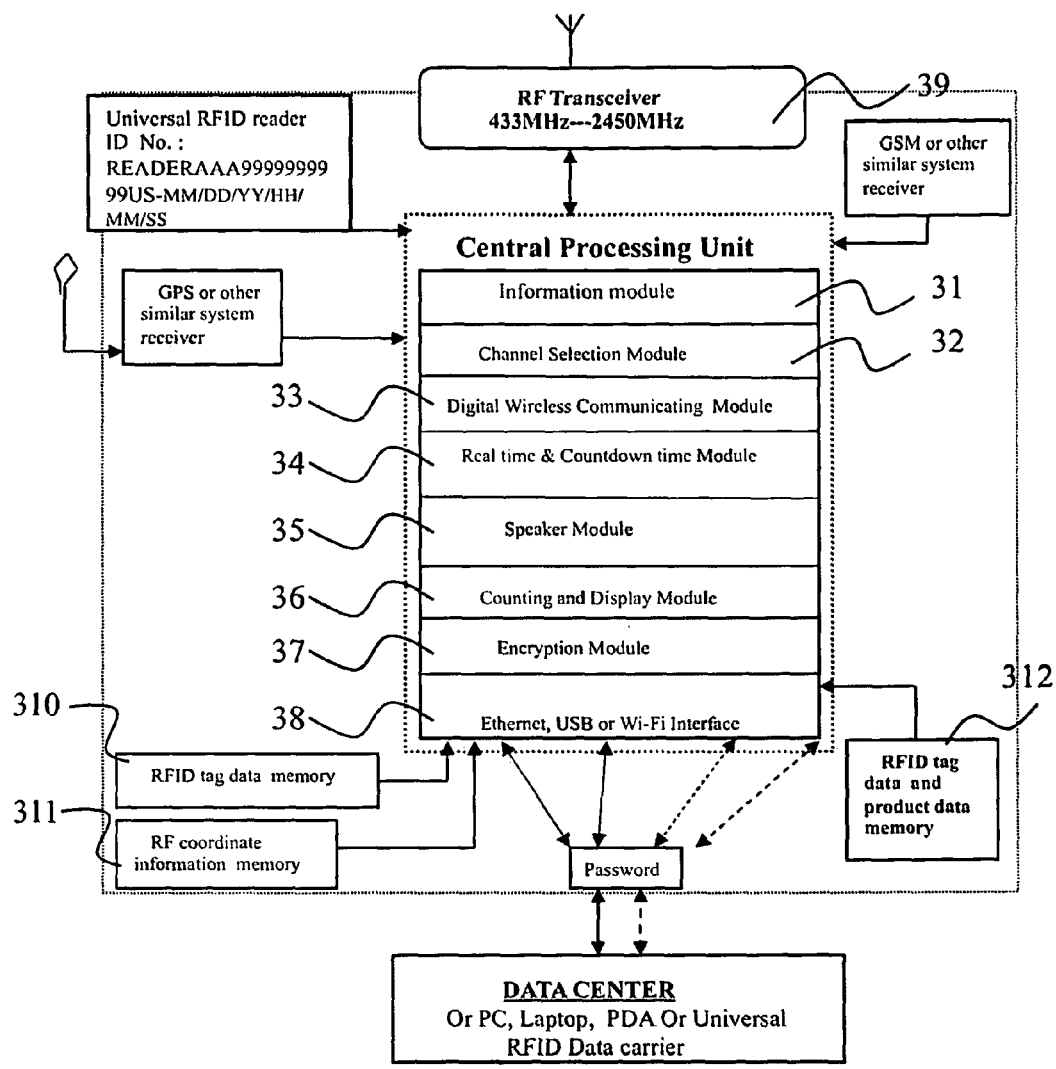
FIG. 3 is the illumination of the main components of the RFID reader.

FIG. 3 illustrates the components of the RFID reader. The information module 31 is supported by GPS or similar systems, like The Russian Global Navigation Satellite System (GLONASS), Chinese Compass navigation system and the European Union's Galileo positioning system. GPS and similar system generate the latitude and longitudinal coordinate and the coordinate information will be cross-referenced to a database to determine the real time geographical locality of the universal RFID reader. The real time location information is then used by the information module to compare and further to find out the legal RF and related regulation for further channel and transceiver selection.

In certain circumstances and environments, such as the inside of a manufacture's facility or between the big buildings, GPS or other similar system signal might be too weak to be received, which will cause the information module failure to find out the real time location the RFID reader and further result the information module failure to determine a legal RF and related regulation for RFID reader. In such a case, the GSM or other similar system supported wireless digital mobile communicating module 33 is automatically turned on to identify the real time location of the RFID reader. By using the real time location information obtained from GSM via the wireless digital mobile communicating module, the information module can match and find out the legally allowed RF and other related regulations to enable a RFID reader to work properly.

Another role of the information module 31 in the present invention is to combine the real time location data with the RFID reader, which enables all collected data to be real time location data for product transaction in the supply chain.

Figure 5:
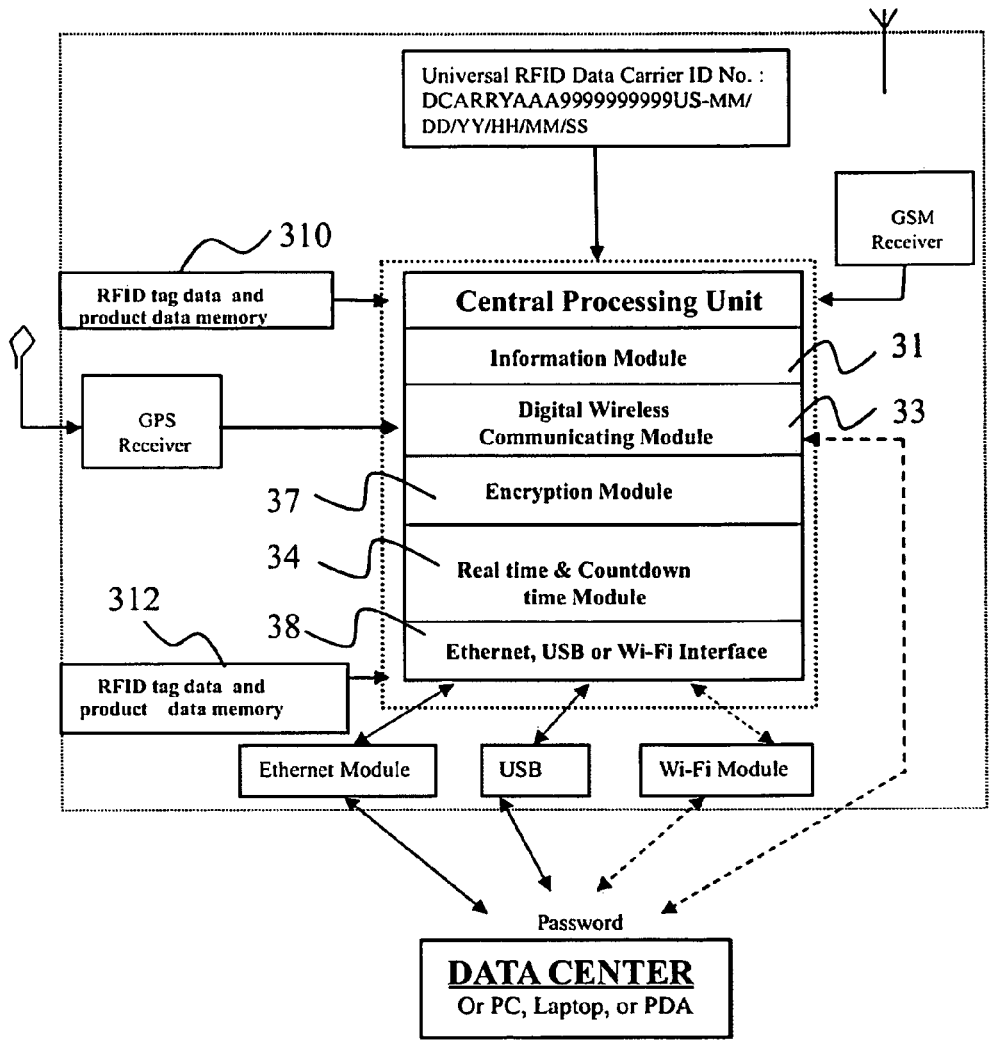
FIG. 5 is the illumination of main components of a universal RFID data carrier.

The third function of the information module 31 is to perform a cross-checking process for each read or collected RFID tag data comparison and confirmation with the original data that were pre-saved in the RFID tag data memory 310 by the RFID system supplier (FIG. 23) for each of all delivered components of the RFID system in the selected RF. This cross-checking function of the information module enable the RFID reader only read the target tags which are pre-saved in the RFID reader or in a RFID data carrier (FIG. 5). The pre-saved RFID tag data is a "data filter" used to filter out all unrelated RFID tags in the reading area. Any unmatched or unknown RFID tag becomes unreadable. The RFID reader can automatically trash, eliminate and delete these no relevant RFID tag data. Such data filter function of the information module can be a way to protect the privacy of both private customer and business user when they use RFID technology or in a technology environment, because no one would like their RFID tag tagged equipments, tolls, irrelevant products and other data or personal information being read or information being released.

Figure 23:
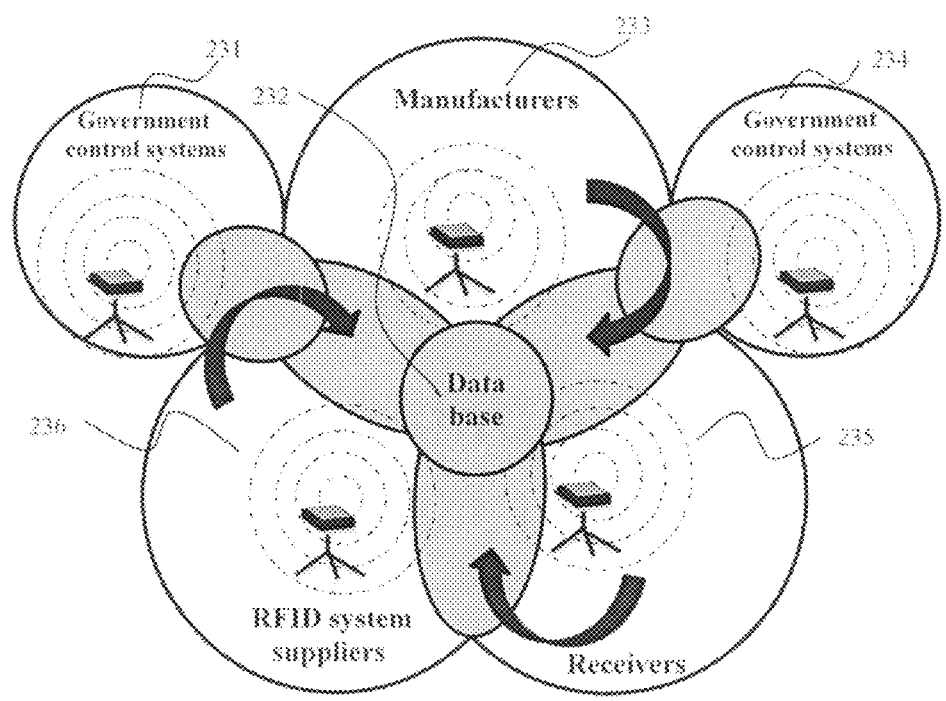
FIG. 23 demonstrates the operation of the RFID system supplier, the manufacturer, the receiver and the government control system.

As result, the function of such "data filter" is another way to protect RFID reader itself safety, anyone has such a RFID reader by any way, it won't work to read any RFID tag if there is no tag data to match with pre-saved RFID tag data in the RFID reader (FIG. 23).

In case, both GPS and GSM or other similar systems fail to work for any reason, such as the weak or overlap signals, supported system down, disaster or other unruly situation, the RFID reader allows manually inputting a real telephone number, including country code, area code and phone number. The information module 31 can automatically run a cross-check to find out the real time location of the RFID reader and further to find out the right RF and regulation information according to each country or region legally allowed, including transmit maximum power, effective radiated power, band width and all related regulations.

The channel selection module 32 analyzes the coordinated information from information module 31 and compare with pre-saved RF coordinate information in the memory 311 in conjunction with channel selection, which is resulting in determination further in deciding on a RF working channel, RF working transceiver, transmit maximum power, effective radiated power, band width and all related regulation for a universal reusable RFID reader to be allowed to work properly.

The RF transceiver 39 of the universal RFID reader can work within the range of RF from 433 MHz to 2.45 GHz or any required legally allowed RF. The active tag used for shipping container or trailer or any other special usage can be chosen at the RF range of 433 MHZ or 2450 MHz, while in the range of 840 to 970 MHz are used for the RFID passive or semi-passive tag used for pallet and box labeling according to ISO 17363, 17364, 17365, 17366, ISO/IEC 18000-3, 18000-4 & 18000-7 or EPCglobal Tag Notification and each country or area regulation. It should be pointed out that a shipping container or a trailer is not only an efficiently tool for products movement at the assembled way, it is also an important data for data assembly and aggressively handled by the manufacturers, the shipping system, the product receivers, the government control system and the RFID system supplier (FIGS. 1, 2, 17, 19 and 23). Especially both frequencies (433 MHz and 2450 MHz) for active tag used for container are different from the frequencies for the passive or the semi-passive RFID tags used for pallets and boxes (840 to 970 MHz), which can be easily identified and managed by RF system (ISO 19363, 19364, 19365, 19366 and 19367) for the inventory control.

Figure 13:
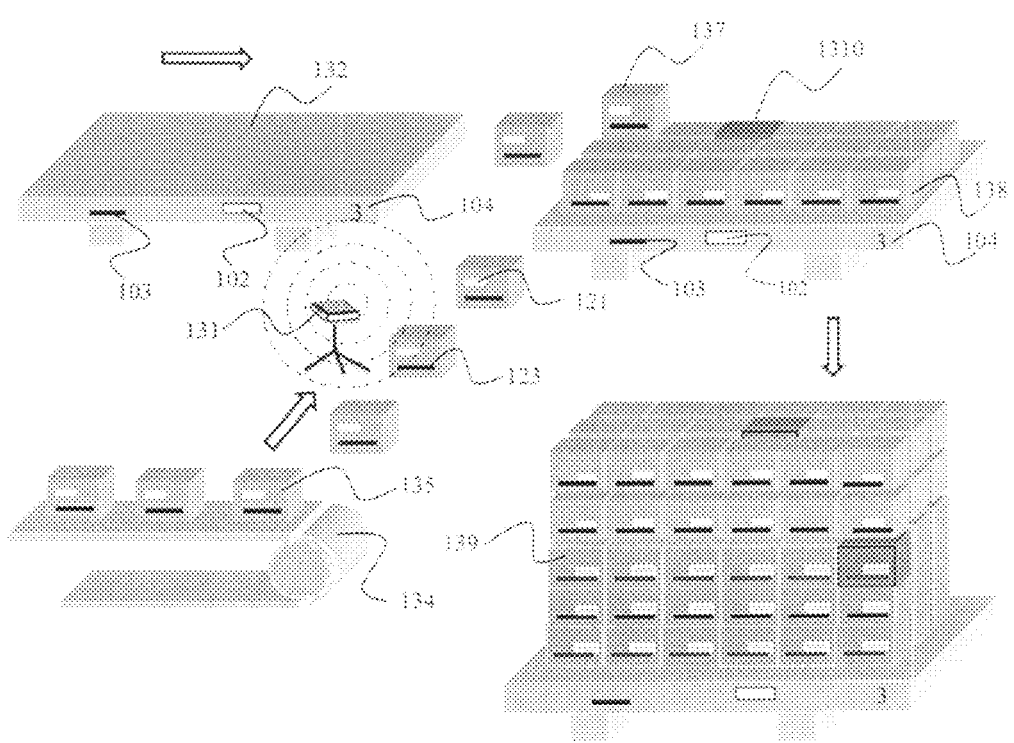
FIG. 13 to FIG. 18 is illustration of data collection, data comparison, data confirmation and data combination by using the RFID system during the process of the palletization and containerization in the original place.
Figure 20:
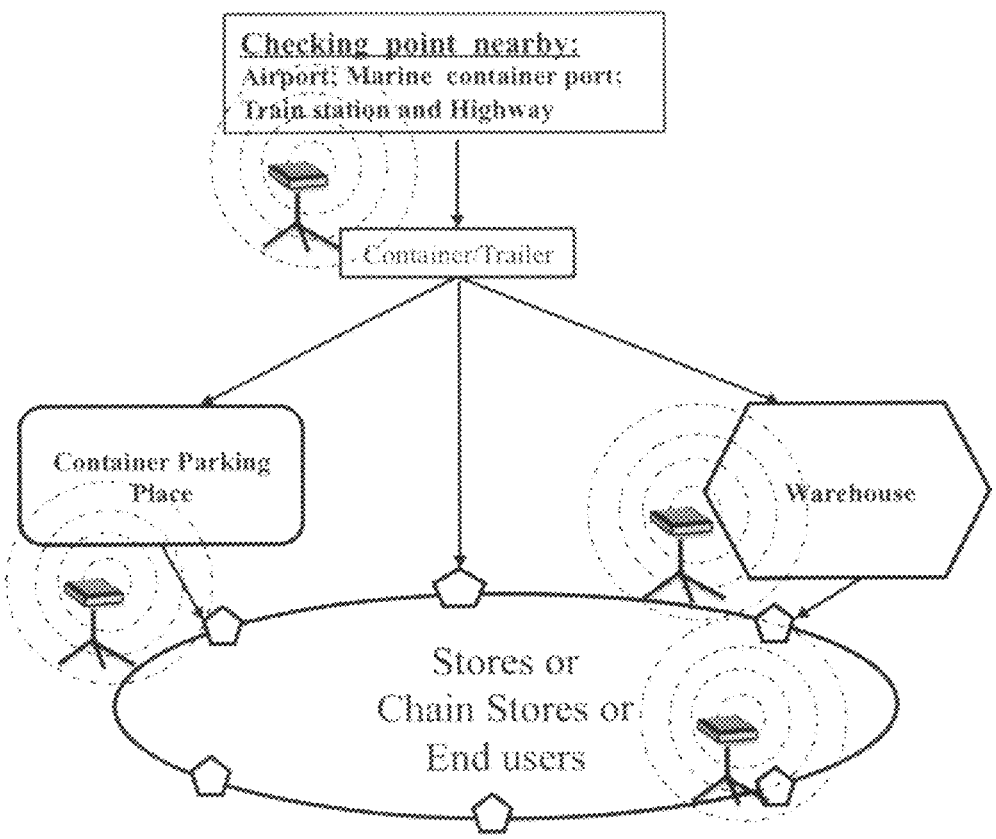
FIG. 20 is a check point set up by the receivers or the end users to monitor all arriving containers.

The wireless digital mobile communicating module 33 supported by GSM or similar system can obtain the real time location data, which can be used by information module as described. The wireless digital mobile communicating module 33, supported by GSM or similar system is also used to download or input data as required wirelessly. This allows RFID reader to transfer real time data and real time location data in live between the manufacturer and the government control system, the manufacturer and the receiver or the buyer or the end user in the course of RFID tag data being collected from the original place during the palletization and the containerization. As a special requirement or law enforcement, the wireless digital mobile communicating module supported by GSM or similar system can transfer video and picture in live at the real time and the real time location for data collection and data confirmation in the original place or the receiving place by all involved parties (FIGS. 13, 20 and 23). For safety purpose, both universal and reusable RFID reader and universal and reusable RFID data carrier are unable for voice transfer as a mobile phone.

Figure 9:
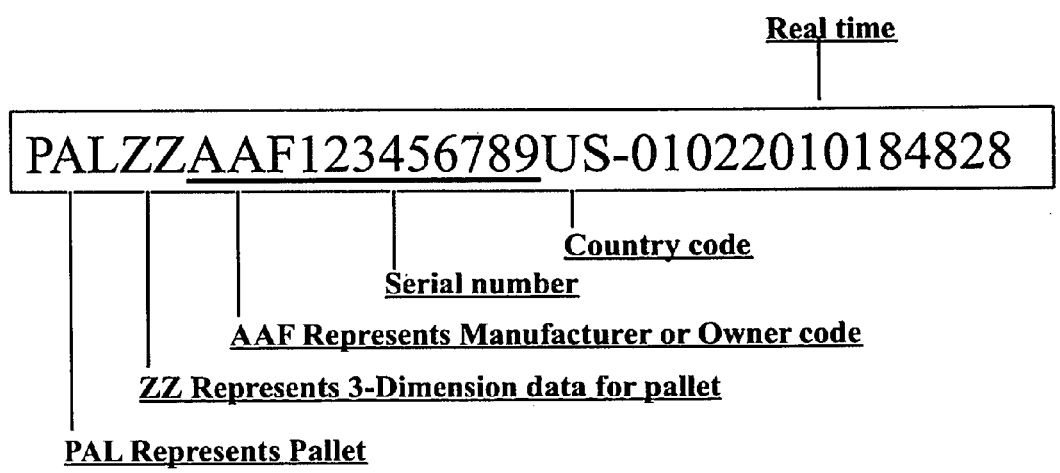
FIG. 9 is an example of the universal, reusable and neutral RFID tag data format for C & R pallet.

The real time module 34 is used to create a lifetime unique ID for the RFID reader (FIG. 4), a lifetime unique ID for the RFID data carrier (FIG. 5), a lifetime unique neutral RFID tag used for a C & R pallet (FIG. 9) and a lifetime unique neutral RFID tag used for a C & R box (FIG. 9).

The countdown time module 34 is used to create a time period to monitor all products either in a warehouse as stock or in transportation. The countdown time is also used to calculate the time for each of all rented components of the RFID system (FIG. 23).

Figure 19:
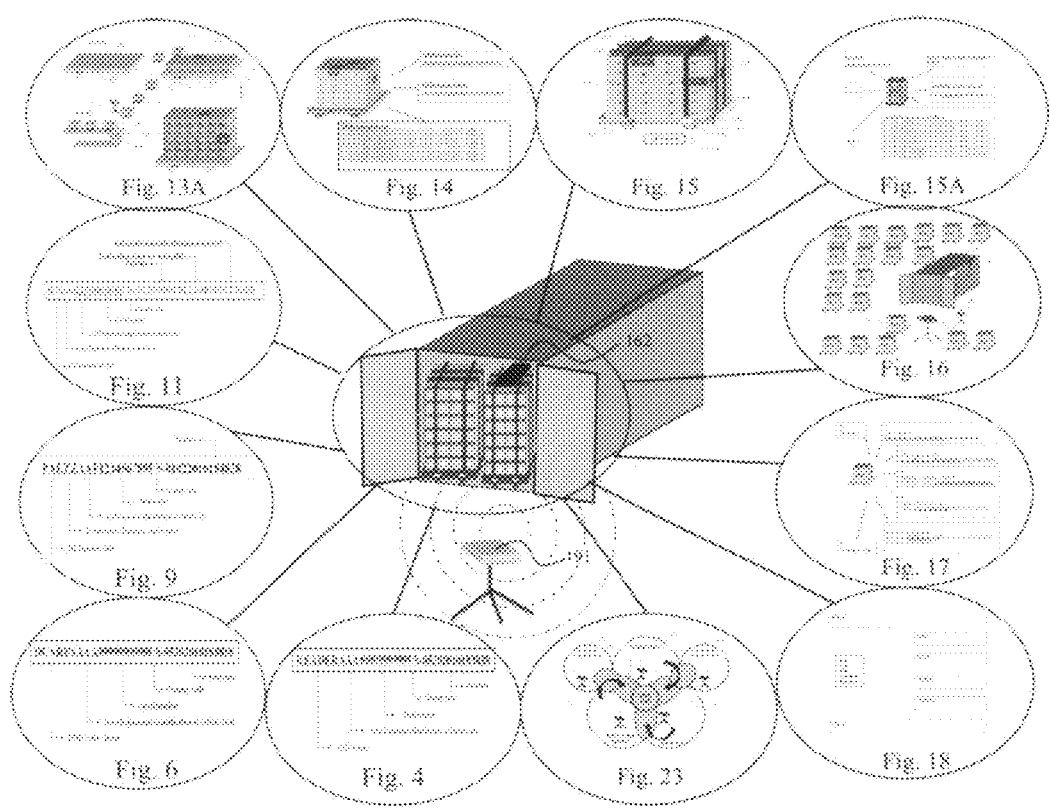
FIG. 19 is the illustration of the verification methods for products and product data.

The speaker module 35 is used to produce a sound after each targeted RFID tag being read by the RFID reader (FIG. 13). This function allows the RFID reader to remind the operators in live during the data collection and further to ensure each of all RFID tags on each of all pallets and boxes being read at 100% accuracy (FIGS. 13, 19 and 23). The second function of the speaker module 35 allows inputting data via voice for RFID tag data collection and RFID tag data verification (FIGS. 13, 15, 17, 19 and 21) due to any reason caused a neutral RFID tag to be unreadable by a universal and reusable RFID reader.

The counting and display module 36 can automatically turn each read RFID tag to a display LED digital number. This is another way to supervise reading each of all RFID tags during the data collection. The display increases in consecutive numerical value after each target RFID tag being read and each C & R box being stacked on to the pallet. The corresponding number of read tags will be automatically increased as each tag being read and the total number shown on the display will be the total number of boxes on each built pallet. Using or not using the function of a display LED can be optional during the data collection (FIG. 13).

The encryption module 37 is used to protect the collected data and information saved in memory 312 in the RFID reader or in the universal and reusable RFID data carrier in the data collecting or transferring place or in a container or trailer during the product transportation. All data and information can be viewed and downloaded via USB or wirelessly only after a password being checked during the transaction of the Custom declaration, the security checking or any related authorization control system, and unloading operation in the warehouse of the receivers or the end users. For safety reason, a log of all accesses will be recorded for all authorized users to use universal and reusable RFID reader or universal and reusable RFID data carrier to review or download data when logged in each time.

The Ethernet, USB, Wi-Fi 38 or digital wireless communicating module 33 can be used for the purpose to view the whole process of RFID tag data collection at real time manner in the real time location for all parties. The Ethernet, USB, Wi-Fi module 38 or the digital wireless communicating module 33 allows inputting or downloading all collected data, product information, picture or living video during palletization and containerization at an available and convenient manner for all legally involved users or parties via computer or similar device and system.

Figure 4:
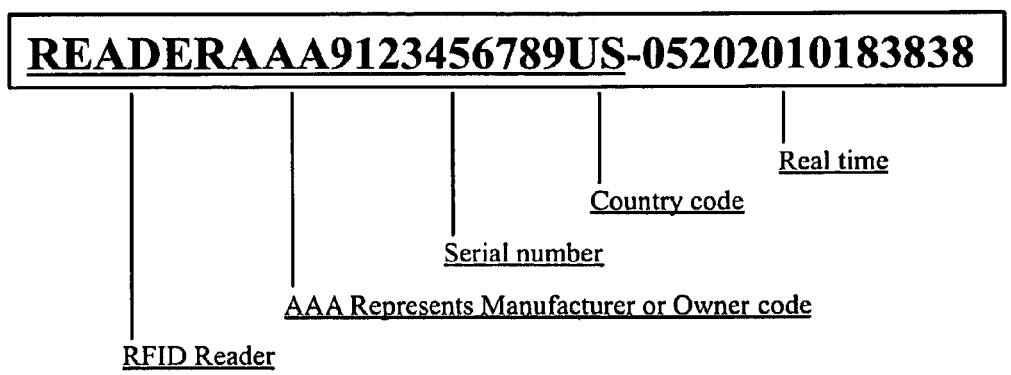
FIG. 4 is the composition of a lifetime unique identification number for the RFID reader.

FIG. 4 is the data format of a lifetime unique identification number (ID) used for a universal and reusable RFID reader. The lifetime unique ID used for the RFID reader is comprised with five parts.

The first part of an identification number (ID) is beginning with word of "READER", which is easy to understand by system controllers and easy to be recognized by the whole supply system.

The second part is the RFID reader manufacturer or owner code represented by a group of three letters selected from the range of A to Z in triplet of "AAA" to "ZZZ".

The third part is the serial number composed with 10 digital numbers from 0 to 9 for each RFID reader from the same manufacturer or owner (AAA to ZZZ) in the same country.

The fourth part is the country code represented by two letters, like US is the Unite States and CN is P. R. China.

From the first part to the fourth part are permanent and unchangeable.

The fifth part is the real time created at the time when the RFID reader working channel is selected and ready to be used for RFID tag data reading. The real time, herein and afterwards, includes the data of Month (MM), Date (DD), Year (YYYY), Hours (HH), Minutes (MM) and Seconds (SS). After the working RF being selected and the RFID reader is in the status of ready to work, the real time is recorded. The recorded real time is combined with the first part to the fourth part and further set up a lifetime unique ID for this universal and reusable RFID reader for each time of use. Each lifetime unique ID described here has no any relationship or any information related to any products or merchandise, manufacturer, supplier, carriers or the receiver directly or indirectly.

A lifetime unique RFID ID for the RFID reader can be only used and valid for the period of 24 hours from the time of such ID being created. Each lifetime unique ID will guarantee that there won't be a same ID to be used in the supply chain and logistics management, no matter the same RFID reader is being reused repeatedly in the same or different places or manufacturers for same or different products.

By way of example, the RFID reader is manufactured from AAA with a serial number as 9999999999 in the country of the Unite States and the time of this ID was set up for use in May 20, 2010 at 18.38.38 PM. The identification number set up for such a universal and reusable RFID reader is "READERAAA9999999999US05202010183838". The underlined parts (the first to the fourth part) are readable. Once the first to the fourth parts are conjoined with real time to create a lifetime ID, this whole ID can be only read by the receiver or the government control system or the RFID system supplier or a party allowed by the receiver via computer or similar devices.

The RFID reader ID is an important and key data by providing the real time and real time location data. When a RFID reader ID is combined with each of all collected data, it helps to confirm and monitor the movement of products and all components of the RFID system at real time and real time location manner in the supply chain (FIGS. 13, 15A, 17, 18, 19, 20, 21 and 23).

FIG. 5 is the components of the universal and reusable RFID data carrier. The RFID data carrier in the present invention is specifically used to carry all RFID reader ID data, RFID tag data on each of all C & R pallets and boxes, product data and product related information collected from the original place via the RFID reader (FIG. 3) during the process of palletization and containerization (FIG. 13 to FIGS. 13E, 16 and 18). All modules, including the information module 31, the communicating module 33, the real time and countdown time module 34, the encryption module 37 and the Ethernet, USB, Wi-Fi 38, in the universal and reusable RFID data carrier have the same function as described in FIG. 3 for the RFID reader. A universal and reusable RFID data carrier is all time and always shipped with products in a container or a trailer. All data saved in the universal and reusable RFID data carrier 312 can be viewed or downloaded by computer or similar devices via Ethernet, USB, Wi-Fi or GSM after passing the password checking.

The universal and reusable RFID data carrier also provides a way to implement paperless, mark-less and labeling-less business transactions in the whole supply chain and the government control system, since data transfer and review can be performed electronically.

The universal and reusable RFID data carrier is an extra way to protect all collected data safety. Though the database via the internet, E-mail, wireless and other potential way provides much fast and comparative safe for data transfer, internet or GSM system or other wireless system occasionally may stop working due to hiker, virus, electric supply or mechanic transfer system problem or disasters. This is a real and potential issue to be taken into account for the supply chain management so that the whole supply chain is able to work all time without any interruption. The use of a RFID data carrier for products and product data movement in the supply chain is a practical and safe way in the supply chain management.

The universal and reusable RFID data carrier in a shipping container or trailer enables all product data and product verification to be carried out under any conditions or circumstances with or without a RFID reader or a barcode scanner (FIG. 19), since all data and the received product verification are relied on the data comparison with the originally collected and contrast able data (FIGS. 14 and 17) carried by a universal and reusable RFID data carrier.

Figure 6:
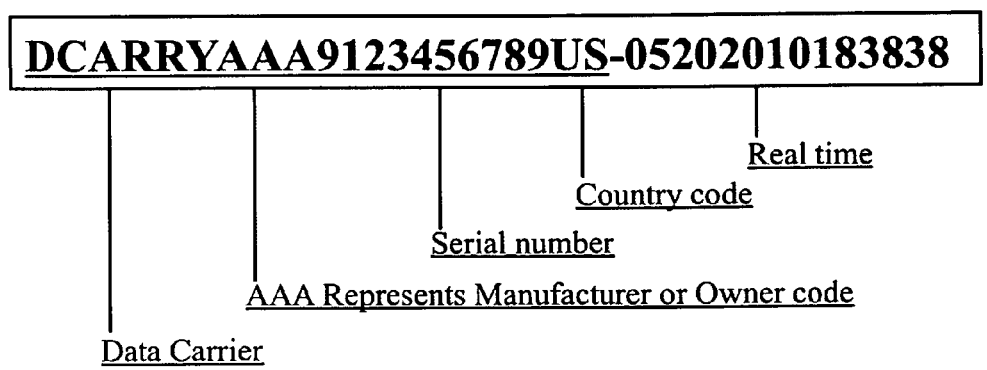
FIG. 6 is the composition of a lifetime unique identification number for the universal and reusable RFID data carrier.

FIG. 6 is the composition of a lifetime unique identification number (ID) used for a universal and reusable RFID reader. The lifetime unique identification number (ID) for universal RFID data carrier comprises five parts.

The first part of an identification number (ID) is using the word of "DCARRY", which can be easy to understand by the system controller and easy to be recognized by the whole supply chain system.

The second part is the RFID data carrier manufacturer or the owner code represented by a group of three letters selected from the range of A to Z in triplet of "AAA" to "ZZZ".

The third part is the serial number composed with 10 digital numbers for each RFID data carrier with the same manufacturer or owner (AAA to ZZZ) from the same country.

The fourth part is the country code represented by two letters, like US is the Unite States and CN is P. R. China.

The first to the fourth parts are permanent and unchangeable.

The fifth part is the real time created at the time when the universal and reusable RFID data carrier is set up and ready to be used to carry all data transferred from the RFID reader. The real time includes the data of Month (MM), Date (DD), Year (YYYY), Hours (HH) Minutes (MM) and Seconds (SS). The recorded real time is then combined with the first to the fourth parts and further creates a lifetime unique identification number for this universal RFID data carrier. The method to create a lifetime unique ID will guarantee that there won't be a same ID to be used in the supply chain and logistics management even the same RFID data carrier can be repeatedly reused with no limitation.

By way of example, the RFID data carrier was manufactured from BBB with a serial number as 1234567890 in the country of the Unite States and the time of this ID was created in May 20, 2010 at 18.38.38 PM. The identification number set up for such a universal and reusable RFID reader is "DCARRYBBB1234567890US05202010183838". The underlined parts (the first to the fourth parts) are readable. Once the first to the fourth parts are conjoined with the real time to create a lifetime unique ID, this ID can be only read by the receiver, the government control system, the RFID system supplier or a party allowed by the receiver via computer or similar devices.

A universal and reusable RFID data carrier ID is a very important and useful data for data combination in product transaction by providing the real time and real time location data. When a universal and reusable RFID data carrier ID is combined with each of all collected data, it helps to confirm and to monitor the movement of products and all components of the RFID system at the real time and real time location manner (FIGS. 17, 19, 20, 21 and 23).

Figure 7:
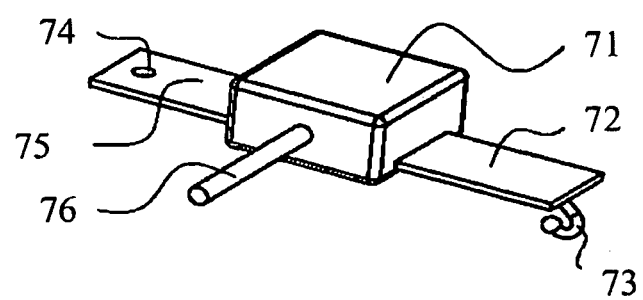
FIGS. 7 and 8 is an exterior structure of a RFID reader or a RFID data carrier.
Figure 16:
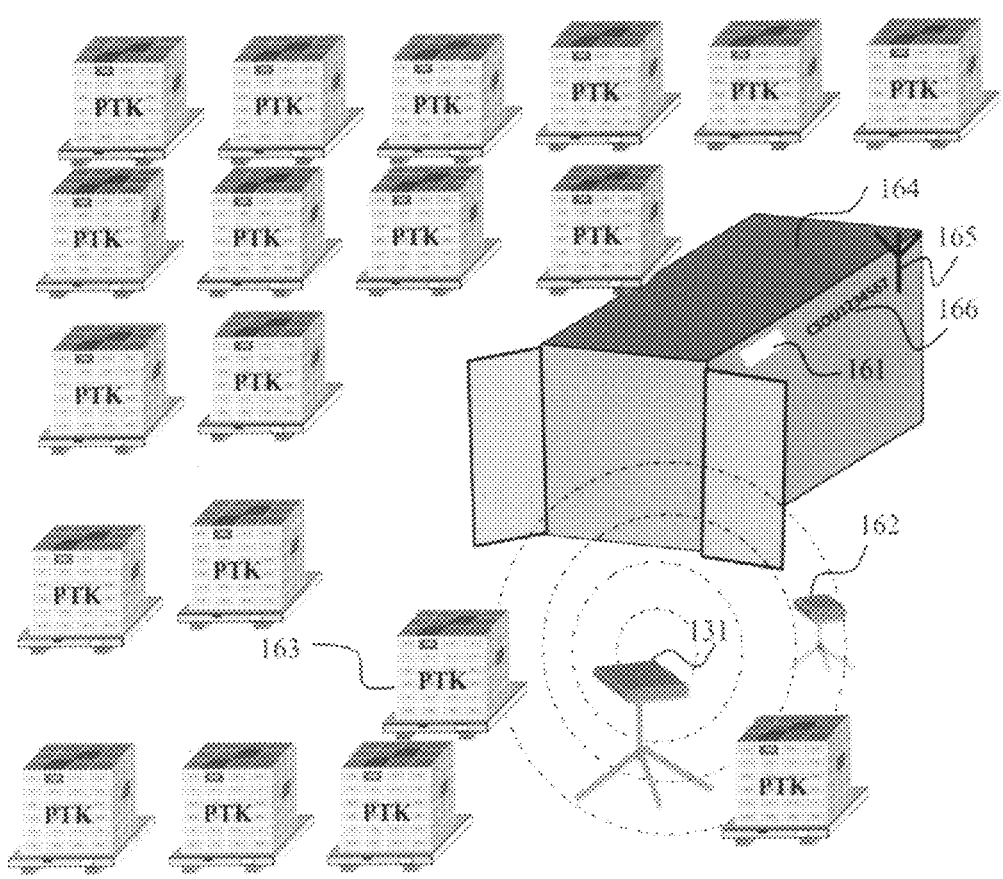

FIG. 7 is the exterior structure of the RFID reader and the universal and reusable RFID data carrier. Two belts, 72 and 75, are on the RFID reader or the universal and reusable RFID data carrier 71. One belt 72 has a hook 73 on the distal end and the second belt 75 with a hole 74 on the distal end. The hook 73 will be coupled with the holes on the belt in the C & R pallet and the hole 74 will be coupled with the hook on the C & R pallet (for detailed structures and descriptions, please refer to U.S. patent application Ser. No. 12/728,243 and P. R. China patent No.: 200910177769.X). The support shaft 76 on the RFID reader or the RFID data carrier is used to hold and support both RFID reader and RFID data carrier in the process of the data collecting and the data transferring during palletization and containerization (FIGS. 13 and 16). Both belts 72 and 75 can be used to fix either a reader or a RFID data carrier with the last pallet inside of the container or the trailer during product transportation.

Figure 8:
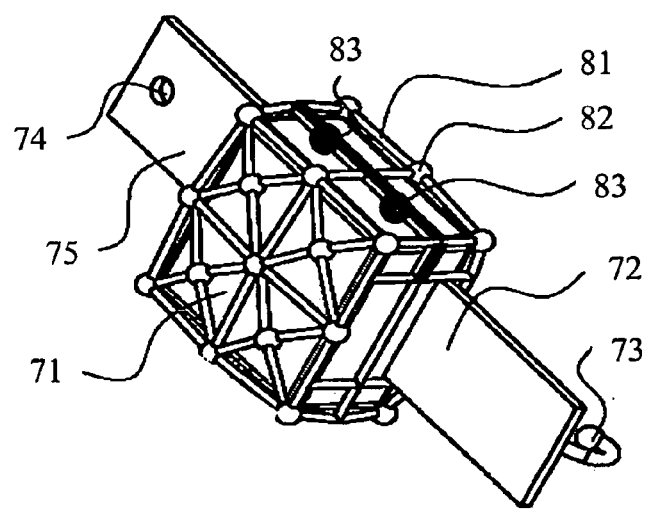

FIG. 8 shows the detailed structure of an anti-collision net 81 used to protect the RFID reader 71 or the universal and reusable RFID data carrier 71. Each of all anti-collision balls 82 is connected by the anti-collision net 81. After the RFID reader or the universal and reusable RFID data carrier being kept into the anti-collision net, the net is closed and sealed with buckles 83.

FIG. 9 is the basic format of a universal, reusable and neutral RFID tag used for a C & R pallet. Each neutral RFID tag comprises five parts. The first part is the letters "PAL", which are the first three letters of "pallet". By using the letter of "PAL" as the beginning part of the neutral RFID tag, it will be easy for data control system and operators to distinguish a pallet from the items, boxes, containers or any other possible way used for product transaction and inventory control.

The second part is the 3-Dimension data (Length (cm/in)× Width (cm/in)×Height (cm/in)) of each C & R pallet represented by a couple of letters from AA to ZZ, which can be expanded to three or more letters according to the requirement in the future. The 3-dimension data of a pallet added to the neutral RFID tag is convenient for all users in the supply chain management. First of all, the RFID system supplier can easily operate their business to sort all recovered RFID tag equipped C & R pallets according to the 3-D data of each pallet and further to prepare the order from their customers. Secondly, all the receivers, buyers and the end users can use the 3-D data for their further business transaction and inventory management. For example, to build a new pallet with different products packaged with different 3-D boxes, the computer or data system can easily work out which 3-D pallet will be the most suitable one for various 3-D boxed products and convenient for transportation. Since the C & R pallet are assembled with more than one part, the 3-D data with country code printed on each part of the C & R pallet will be an additional advantage to be used for the replacement of any damaged part in a pallet.

The third part is the C & R pallet manufacturer or the C & R pallet owner code in a country with the C & R pallet application limitation data represented by a group of three letters selected from the range of A to Z in triplet of "AAA" to "ZZZ". The C & R pallet application limitation is always represented by the third or last letter for each pallet. By way of example, a pallet used for chemicals transportation, the third letter or last letter of the third part will be "C", which means that the C & R pallet can't be used for food product or any other product transportation. This information will be conveniently used for pallet recover, sort and reapplication for safety purpose. The manufacturer or the owner code with the C & R pallet application limitation can be expanded to four or more letters according to the increasing demanding in the future.

The fourth part is the serial number used for each of all pallets with the same 3-Dimension processed from the same manufacturer or the same owner in a country. Each serial number is composed of 9 decimal numbers from 0 to 9. The first number for the same 3-D pallet from the same manufacturer or owner starts from 000010001, which can reduce the reading mistake when data to be input via voice or a keyboard.

The fifth part is the country code represented by two letters, like US for the United States, CN for People's Republic of China. The country code is used for each of all pallets made in a country, which is a simple way to increase the availability of unique identification number for the pallets in the world wide.

All data in neutral RFID tag, from the first to the fifth part, are permanent locked, unchangeable and un-killable.

The whole data (from the first to the fifth part) can be simply encoded to a RFID tag by using eight bit binary code system (8-bit ASCII code), which is currently used for most computer systems and processor instructions. This makes the RFID tag data to be encoded or decoded simply and to be viewed conveniently on computer or similar devices when the signal carried all data from a neutral RFID tag being captured or read via a RFID reader.

The third part and fourth part of a neutral RFID tag for a C & R pallet are readable parts and are printed on the four side planes of a pallet. The readable part (the third and the fourth part) expressed by barcode and printed under the readable part is an advantage for data recovery or data verification. This allows the readable part on the C & R pallet to be conveniently read and input either via a keyboard or voice or a barcode scanner to the RFID reader or data system when it is unreadable for any reason. Obviously, the readable part of a neutral RFID tag solves the problem when a neutral RFID tag is unreadable by a RFID reader or a barcode scanner under certain conditions or circumstances (FIGS. 13, 16, 19, 20, 21A and 23).

Each neutral RFID tag used for a pallet is valid for product transaction only when each neutral tag is combined with a real time. The real time is the time when a neutral RFID tag data on a C & R pallet is read by a RFID reader and passed through a cross-checking by information module for data comparison and further confirmation with the pre-saved RFID tag data by the RFID system supplier (FIG. 23). The real time includes the data of Month (MM), Date (DD), Year (YYYY), Hours (HH), Minutes (MM) and Seconds (SS). The combination of a neutral RFID tag with a real time makes each tag to be a lifetime unique one for a pallet for each time use, no matter the same pallet may be used repeatedly in a warehouse or manufacturer for same or different products. Therefore the neutral RFID tag in the present invention fixed onto a C & R pallet can be reused again and again with no limitation.

Figure 15:
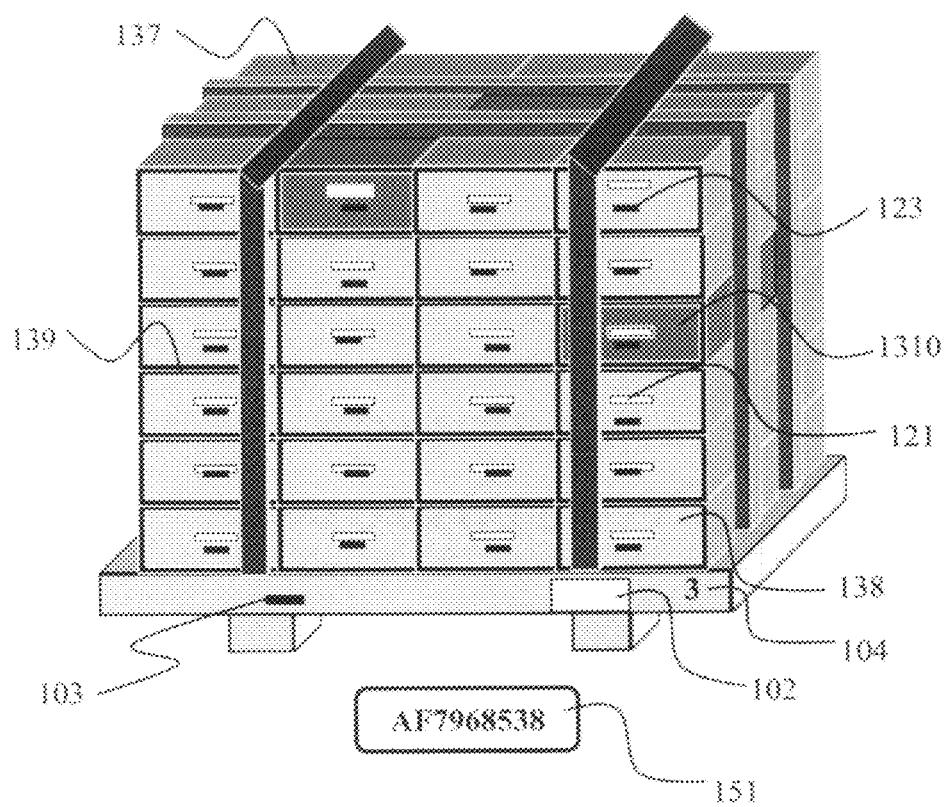
Figure 15A:
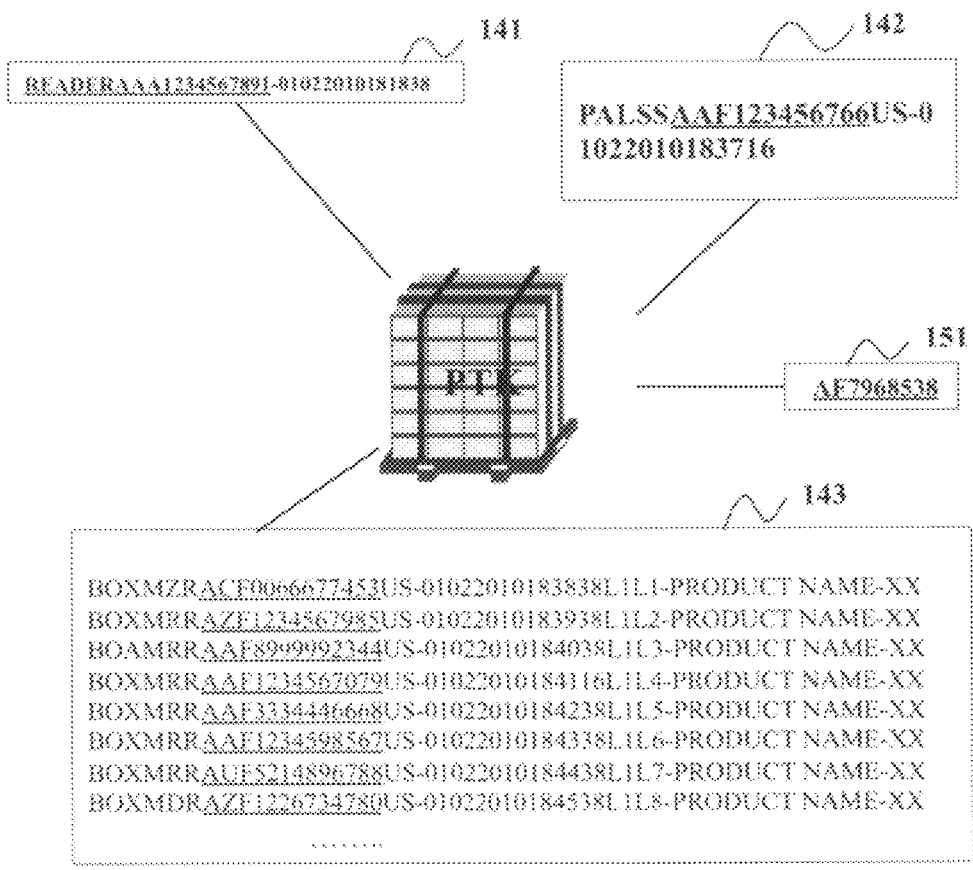
Figure 17:
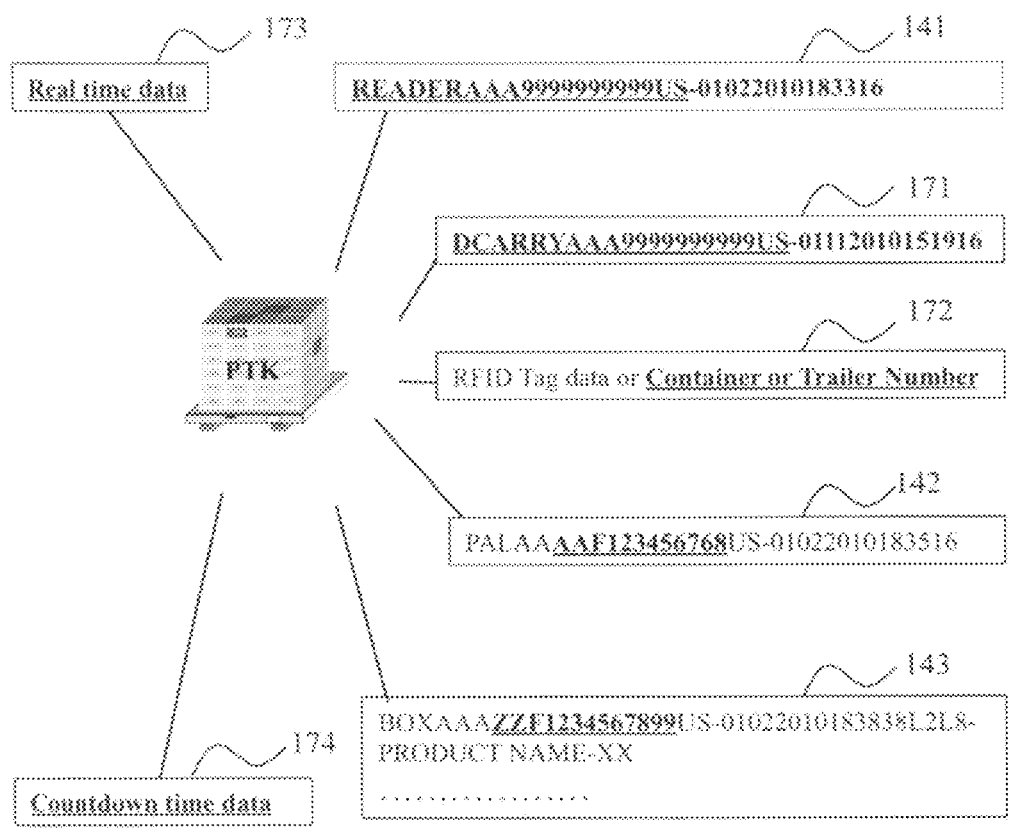

The lifetime unique RFID tag for a pallet created from the original place reading is a key datum to set up 3-D data system for real time and real time location inventory control and product movement (FIGS. 15A, 17 and 23).

Charge-free for each time use of a neutral RFID tag on the C & R pallet is a significant impetus for RFID technology application in the supply chain. The charge-free to use a neutral RFID tag on the C & R pallet is based on the following:

a. The cost for each neutral RFID tag is already paid by the owner of the such C & R pallet for the purpose of their business operating (FIG. 23), the neutral RFID tag is all time and always used for C & R pallet collection and reapplication by the RFID system supplier;

b. The cost for each time using the neutral RFID tag on the C & R pallet can be as lower as even to be charge-free, since the C & R pallet can be repeatedly used as long as the C & R pallet is functional well. For example, if a pallet can be reused for 100 times and the neutral RFID tag costs 1 dollar, it only costs 1 cent for each time using;

c. The neutral RFID tag is well protected from any possible damage by friction or collision during loading or unloading for transportation, since the neutral RFID tag is inserted into the side planes of the C & R pallet, of which will prolong a RFID tag life time.

d. The C & R pallet and the neutral RFID tag using cycles can be obviously increased since any damaged part on the C & R pallet can be replaced with new part.

The neutral RFID tag in the present invention is the safest one to protect all business transactions. It is not necessary to set up any form or any kind of encryption or password for each RFID tag for security reason. All data of a neutral RFID tag used for a pallet have no direct or indirect relationship regarding to the details or specific information or data on each of all items or products or subjects carried by the pallet. All data in a neutral RFID tag (the first to the fifth part), read by any kind of RFID reader, do not contain or revel or mean any information related or relevant to each of all items or products or subjects or manufacturers or the receivers or any related parties in any way during the C & R pallet used for product transaction.

The neutral RFID tag can be read from RF 433 and 2450 MHz or any special RF according to the requirement for active RFID tag, 840 MHz to 970 MHz for passive or semi-passive tag or any special legal radio frequency as required.

Figure 10:
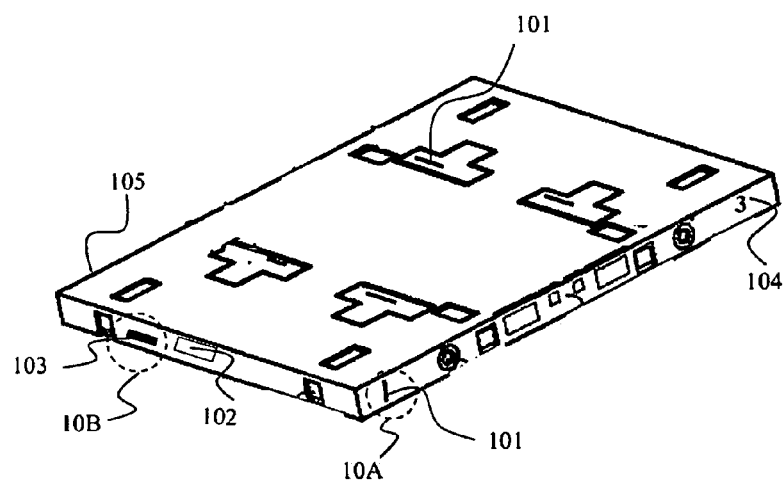
FIG. 10 is a top front view of a RFID tag equipped fully collapsed pallet.

FIG. 10 is a top front view of a universal, reusable and neutral RFID tag equipped fully collapsed pallet. The 3-D data and the country code 101 are directly printed on each part of the pallet, which will facilitate to replace a damaged part from the C & R pallet with a new part. The readable part 103 of the neutral RFID tag 102 is printed on the four side planes of the pallet. Each C & R pallet is numbered with 3 colored with red on the right side plane of the C & R pallet 104. On the opposite top left side plane 105 is numbered with 1 colored with green.

Figure 10A:
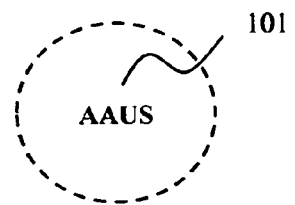

FIG. 10A is an enlarged view of the three dimension data (the second part) and the country code (the fifth part) 101 in a neutral RFID tag 102 printed on each part of the C & R pallet.

Figure 10B:
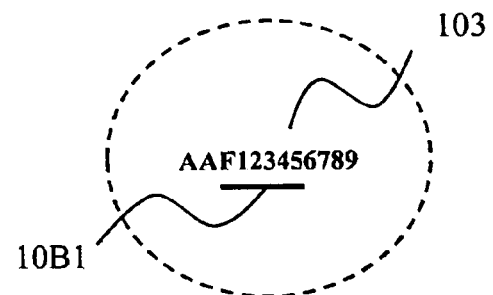

FIG. 10B is an enlarged view to show the detailed contents of the readable parts (the third and fourth part) 103 and the barcode 10B1 printed on the side plane of the pallet.

For detailed structures of a C & R pallet and the methods to fix a neutral RFID tag to the pallet, please refer U.S. patent application Ser. No. 12/728,243 and P. R. China patent No. 200910177769.X.

Figure 11:
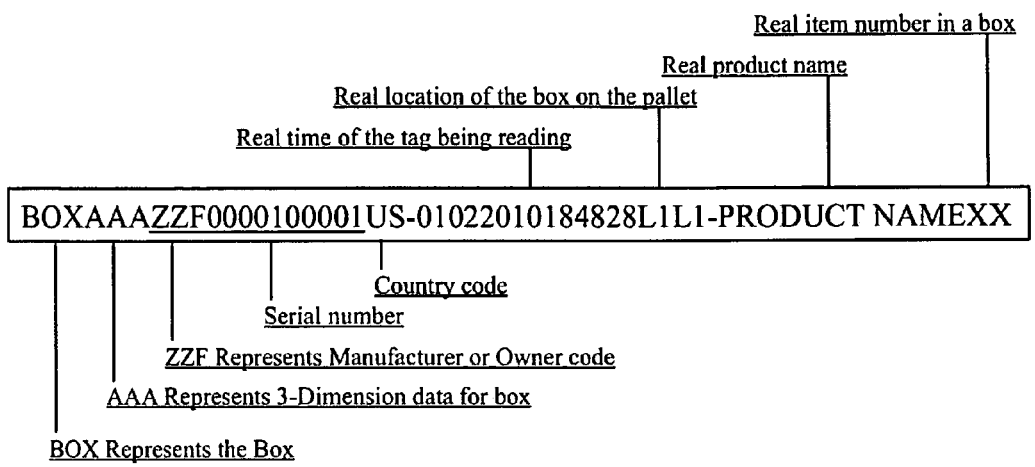
FIG. 11 is an example of the universal, reusable and neutral RFID tag data format for C & R box.

FIG. 11 is the data format of a neutral RFID tag used for the C & R box. The first part is the word "BOX" to represent a tag used for a C & R box for product package at a box level. Box level means packaged or unpackaged one or more than one products to be boxed in a C & R box for moving from the manufacturer to the market or to another manufacturer for further assembling or processing or any similar purpose. By using the word of "BOX" as the beginning of a neutral RFID tag, it will be easy for data system and inventory controllers to identify and distinguish a box from items, pallets and containers in the operation of product transactions and the inventory control.

The second part is the 3-Dimension data (Length (cm/in)× Width (cm/in)×Height (cm/in)) for each C & R box represented by a group of three letters selected from the range of A to Z in triplet of "AAA" to "ZZZ", which can be extended to four or more letters according to the requirement in the future. The 3-dimension data can help the RFID system supplier to efficiently operate their business, to sort all collected boxes according to 3-D data and further to prepare each order for each of customers. All the manufacturers, the product receivers, the buyers and the end users can use the 3-D data on the RFID tag for their further business transaction. For example, to build a new pallet with the same or different products packaged in the same or different 3-D boxes, the computer or data system can easily figure out which box(s) will be stacked in the same layer and which boxes will be stacked on different layers on the C & R pallet so that all boxes can bound each other on the C & R pallet for a better result in product transportation. The 3-D data will be an additional help to conveniently replace any damaged part with a new part in a C & R box.

The third part is the C & R box manufacturer or owner code in a country and the C & R box application limitation data represented by a group of three letters selected from the range of between A to Z in triplet of "AAA" to "ZZZ". The C & R box application limitation is always represented by the third or last letter of the third part for each box. For example, a box used for chemicals transportation, the third letter or last letter of the third part will be "C", which can't be used for food products or any other product transportation. This information will be conveniently used for box recovery, sorting and reapplication for safety purpose (EXHIBITS. 2 and 3). The manufacturer or owner code can be expanded to four or more letters according to the requirement in the future.

The fourth part is the serial number for each of all C & R boxes with the same 3-Dimension data, which are processed from the same manufacturer or belong to the same owner in a country. Each serial number is composed with 10 decimal numbers from 0 to 9. The first number for the C & R box from a group of same 3-D from the same manufacturer or owner is always starts from 0000100001. This will avoid any mistake and difficulty, in case, to input the readable part by voice or a keyboard due to a unreadable tag for any reason (FIGS. 13 and 19).

The fifth part is the country code represented by two letters, like US for the United States, CN for the People's Republic of China. The country code in each tag is another way to increase the total available identification number of the neutral RFID tag used for boxes.

The underlined manufacturer or owner code (the third part) and the serial number (the fourth part) are readable part to be printed on the front, back panels and both left and right collapsible side parts. This allows the readable part on the C & R box can be easily read and input either via a keyboard or voice to a RFID reader or data system when a neutral RFID tag is unreadable or damaged for any reason (FIGS. 13, 15A, 17, 19 and 23).

All data of the neutral RFID tag used for a C & R box, from the first to the fifth part, are permanent locked, unchangeable and un-killable.

The whole data, from the first to the fifth part, on the neutral RFID tag used for a C & R box can be simply encoded to a RFID tag by using eight bit binary code system (8-bit ASCII code), of which is currently used for most computer systems and processor instructions. This makes the neutral RFID tag data to be encoded or decoded simply in RFID technology application for supply chain management.

Each neutral RFID tag, from the first to the fifth part, is used for product transaction and movement only when each read neutral tag is combined with a real time data, real location data and real product name data with real item number data in a box.

The real time is the time when a neutral RFID tag is read by a RFID reader and passed through a cross-checking by the information module in the RFID reader for data comparison, and further is combined the neutral RFID tag (the first to the fifth part). The real time includes the data of Month (MM), Date (DD), Year (YYYY), Hours (HH) Minutes (MM) and Seconds (SS).

The real location is the location of a read neutral RFID tag on the C & R box, combining with the real time, being stacked on the C & R pallet represented by LnLn. The first Ln represents the layer (L) and the layer's number (n) on each pallet, in which the n is ≥1. The second Ln represents each C & R box stacked location (L) and location number (n) on each layer on the pallet, in which the n is ≥1. The first read neutral RFID tag on the C & R box is all time and always placed in the location where marked with 1 colored with green on the C & R pallet or each layer on the C & R pallet and the rest boxes are stacked as following the first one from the left to the right on each layer, and the last box with read neutral RFID tag is always ended in the location where marked with 3 colored with red on the C & R pallet (FIGS. 10 and 13). The real location data for each C & R box with neutral RFID tag can be manually entered after each C & R box being read and stacked on each layer on the pallet, or automatically entered by a RFID reader in the order of each read RFID tag according to the three-D data of the C & R pallet and three-D data of each C & R box to calculate out the total boxes number on each layer and each location number for each C & R box in the order of reading.

The real product name is the name of packaged or unpackaged product in the box. The real name can be entered the real name or the object class code or the product ID code or SKU number or any other forms as required by the receiver or the buyer or the end user. Product name can be pre-entered, if all boxed product are same, or input after each C & R box being read for the same or different products on a pallet.

The real item number is the total items packaged in the box. The number of product in a box can be one or more than one, packaged or unpackaged with no limitation.

Both the real name of product and the real item number in a box can be entered as default for any reason.

The combination of a neutral RFID tag (from the first to the fifth part) with the real time, the real location, the real name of product with the real item number in a box makes each tag to be a lifetime unique one for each time of use, even though the first to five part of the neutral tag is permanent locked and the same box with the same RFID tag can be used repeatedly in a warehouse or manufacturer to carry the same or different product (FIGS. 13, 15A, 17, 19, and 23).

The real time data, the real location data and the real product name data with the real item number data combined with each read neutral RFID tag on each C & R box can be only read through or download from the RFID reader or the RFID data carrier or download from the database, e-mail via computer or similar devices.

Charge-free to use the neutral RFID tag on each of all C & R pallets and C & R boxes is highly and practically possible for all users. The cost of a neutral RFID tag is already paid by the ownership or the possessor of the C & R box for their inventory control, their business operation and others as described in FIG. 9.

The neutral RFID tag in the present invention is the safest one to protect all business transactions in the world-wide, since all kinds of RFID reader can only read the first to the fifth parts of a neutral RFID tag on the C & R pallet or the C & R box which are meaningless on a product or the manufacturer or all the involved parties. It is unnecessary to set up any form or any kind of encryption or password for each RFID tag data for security reason. All data (the first to the fifth parts) of the neutral RFID tag used for C & R box has no any direct or indirect relationship regarding to the detail or specific information or data on each of all items or products or subjects carried by the box. All data in the neutral RFID tag (the first to the fifth parts) read by any kind of RFID readers do not contain or revel or mean any information related to or relevant to each of all items, products, manufacturers or the receivers or any related parties in any way during the C & R pallet and the C & R box used for products transaction.

The neutral RFID tag can be read from RF 433 and 2450 MHz or any RF range as required for active RFID tag, 840 MHz to 970 MHz for passive or semi-passive tag or any special legally opened or allowed radio frequency as desired and required by the users.

Figure 12:
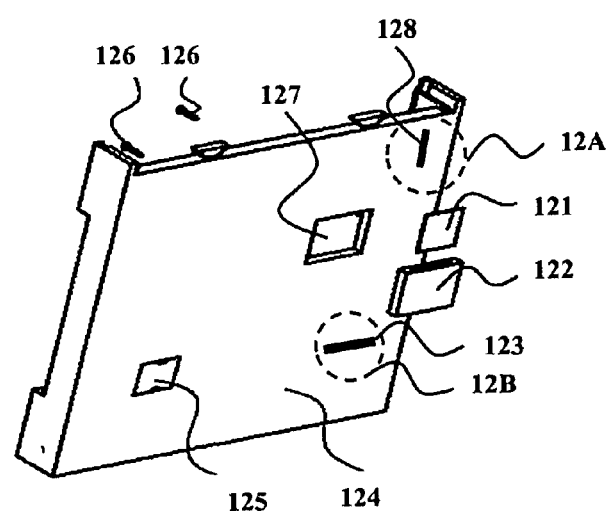
FIG. 12 is a partial exploded view of the front panel of the C & R box equipped with a neutral RFID tag.

FIG. 12 is a partial exploded and a detailed view of a front panel of the C & R box equipped with a neutral RFID tag. A neutral RFID passive tag 121 is placed in the groove of the rectangle plate 122. The rectangle plate is further placed to the groove 127 on the front panel 124 and fixed with plastic screws 126 from the back of the front panel. The readable part 123 of the neutral RFID tag 121, including the third part and the fourth part, is printed on the front, back panels and the collapsible parts on both sides of the box. The three dimension data of the C & R box and the country code 128 in a neutral RFID tag are printed on each part of the box, which will facilitate the replacement of any damaged part(s) from a C & R box. The plastic bag 125 on the front panel is used to keep related information or a note on the C & R box or product as needed. This will keep the C & R box clean from any extra labeling. The transparency plastic bag 125 can be enlarged or reduced in size as required. The detailed methods to fix a RFID active tag, semi-passive tag and the battery used to power both tags are described in the U.S. patent application Ser. No. 12/728,243 and P. R. China patent Nos.: 200810099015.2 and 200910177769.X. For the full detailed structures of a C & R box, please refer to U.S. Pat. No. 7,255,239 B2 and P.R. China patent No. 200410032184.

Figure 12A:
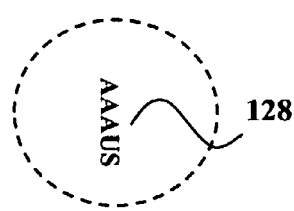

FIG. 12A is an enlarged view of the three dimension data and the country code 128 printed on each part of the box.

Figure 12B:
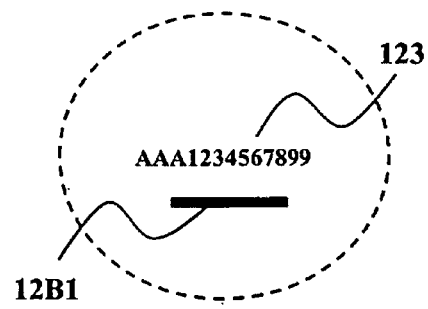

FIG. 12B is an enlarged view to show the detailed contents of the readable parts 123 of a neutral RFID tag 121 printed on the front panel of the C & R box. The readable parts expressed by a barcode 12B1 are printed under the readable part 123.

Figure 13A:
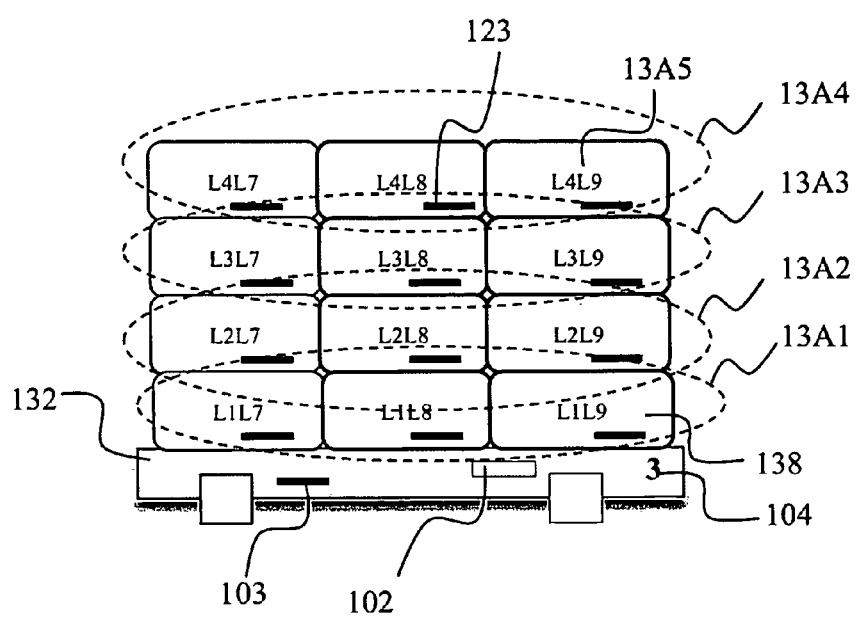
Figure 13B:
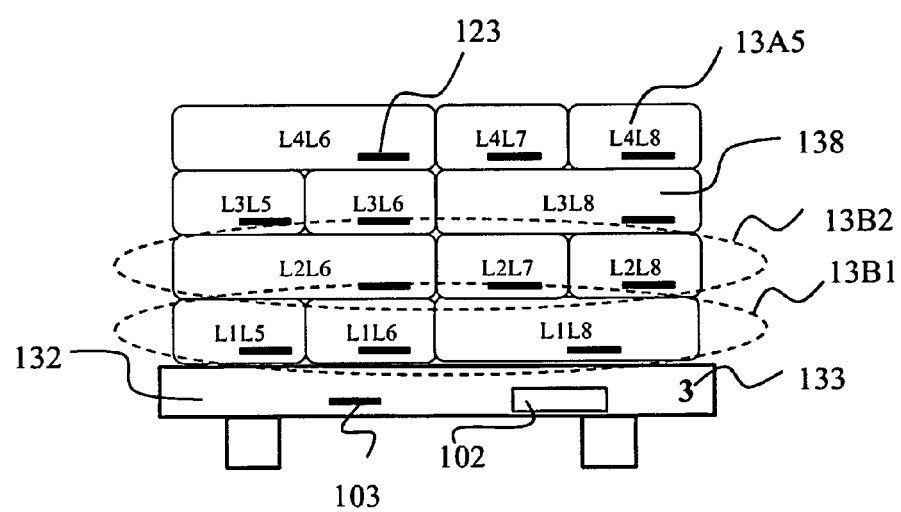
Figure 13C:
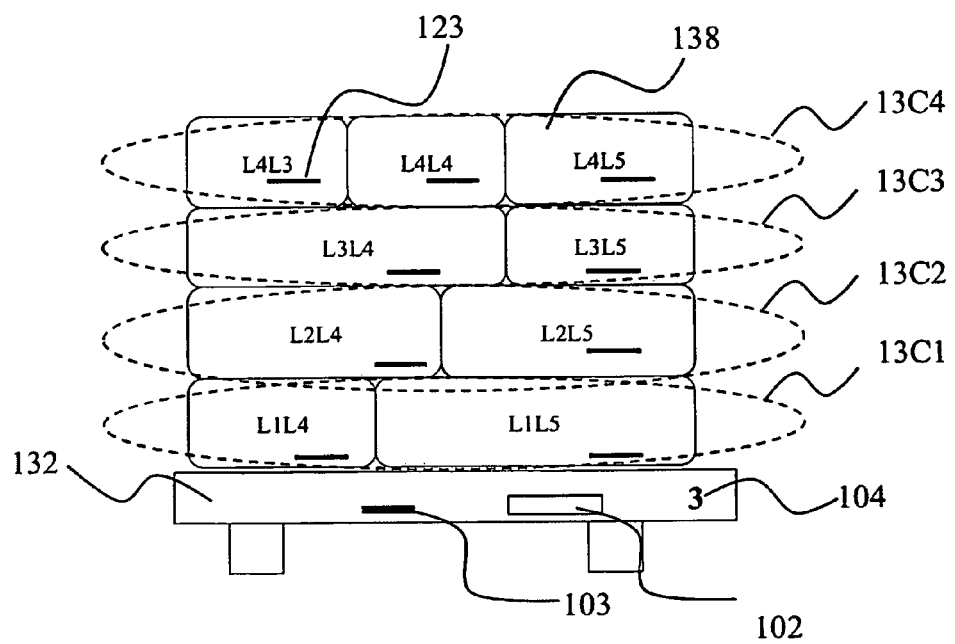

FIGS. 13 to 13C are the illustration of the methods to use RFID system for RFID Tag data collection during the palletization in the original place. The original place referred to the present invention is a manufacturer, a RFID system supplier, a warehouse, the receiver facility or the end user facility with no limitation. A place, handling product data and RFID data collection, data comparison, data confirmation, data combination or product and data verification by using collected data, is an original place.

As afore recited in FIG. 1 and FIG. 2, all manufacturers are handling their finalized products at an item level with 100% accuracy. To efficiently, safely and conveniently move their products to the market, most manufacturers utilize various package methods to assemble their products with different sized boxes, to aggressively unitize or stack all boxed products onto a right size pallet and further to load the well built pallets into a shipping container or a trailer. The palletization is a routinely and necessarily operating in the original manufacturer in order to move their product to the national and international market. The process to build a pallet is almost the same, mostly to stack one box by one box singly onto the C & R pallet or rarely to stack one layer by one layer automatically onto the C & R pallet by the equipment.

As we all know, each of all manufacturers is the best one in the whole supply chain knowing how to handle their finalized products in the world, since they are processing each item from raw materials or various parts one by one. They know the best way how to handle their processed and finalized products at 100% accuracy, otherwise any mistake, involved in the final product packaging, pallet building, pallet loading and product shipping, will cost more money to correct. For example, by shipping out their products over the contracted amount or lesser than the contracted amount, the manufacturer will cost more money to correct the mistake, of which will affect their further business in many ways if the same mistakes are often happened in their product transaction.

Accuracy for the inventory control or the business transaction, either product keeping in a warehouse or product in transportation, must be throughout the whole supply chain and RFID technology provides the high possibility to pass and transfer product at 100% accuracy. To apply the RFID technology in the manufacturer for data collection during the palletization is the ultimate and fundamental important in the whole supply chain. Unfortunately, the current RFID technology application is hard to do because the cost and various RFID standards in the world as afore described in the background of invention. We should keep in mind all times: it is too late to do anything, except to spend more money for restlessly recounting, if we could not collect data at 100% accuracy, combine all data with products in the beginning and all collected data with products are comparable, confirmable, reliable and universal acceptable.

It is common knowledge that a RFID reader simultaneously reads over hundreds RFID tags within the range of RF. However, the palletization process offers an invaluable opportunity for the RFID reader to read each of neutral RFID tags on the C & R pallet and on the boxes by the way of one by one singly.

Let us go through FIG. 13 to FIG. 18 step by step to understand how 100% accuracy of the data can be collected by using the RFID system from an original place via neutral RFID tag data collection, data comparison, data confirmation and data combination.

FIG. 13 illustrates the neutral RFID tag data collecting by using the RFID reader or other ways during palletization. The RFID reader 131 is first turned on and to select a legally allowed RF and RF working channel (FIG. 3). Fewer boxes need to be tested by the RFID reader to find out the optimum for the RFID reader to emit and receive the signal, the effects from the product material on RFID signal and all potential problems related to a neutral RFID tag reading. The RFID reader needs further to detect surroundings of the reading area to find out if it is good enough for RFID tag reading without any other unknown or unfriendly signal interfering. In case, there are still certain unknown signals affect or may affect potentially, a special hood or protective screen structure are used to create a workable environment for the universal RFID reader.

The real time location information used to select a legal and available channel for transceiver to work will be recorded by the RFID reader for further data verification in the supply chain and logistics management (FIGS. 19, 20, 21A to 21D, 22 and 23).

After then, the RFID reader 131 will set up a lifetime unique ID by using the method as afore described in the FIG. 4.

The first neutral RFID tag being read for palletization is always and all time the neutral RFID tag 102 on the C & R pallet 132. When the neutral RFID tag data on the C & R pallet being read, the read neutral RFID tag data will be cross-checked through an automatic comparison with the data saved in the RFID reader by the system supplier (FIGS. 3 and 23). After the comparison is passed and further confirmed, the read RFID tag is then combined with the real time to create a lifetime unique ID for this C & R pallet 132. The whole data is then recorded by the RFID reader. By way of example, the read and recorded RFID tag on the C & R pallet can be viewed via computer or any similar devices as: "PALTYAAF111567899US01022010184016", in which the neutral RFID tag, "PALTYAAF111567899US", was read in Jan. $2^{nd}$ of 2010 at 18:40:16 PM and this pallet is limited to be used for food product transportation (FIG. 9). The underline parts, AAF111567899, are the readable part.

The C & R pallet 132 is always and all time placed by the way of the low right, marked with number 3 on the side plane of the C & R pallet 104 colored with red, to be facing or to be near or closed to the coming box 135 or nearest to the C & R box on the convey 134 or boxed product stacked place. The C & R pallet marked with number 1 colored with green is placed on up-left.

Each of all neutral RFID tags 121 on each of all boxes 135 is then read when the C & R box is passing through the reading area before being stacked onto the C & R pallet 132. When the neutral RFID tag data on a box being read, the RFID reader will perform an automatic comparison with the data pre-saved in the RFID reader by the RFID system supplier (FIGS. 3 and 23). After the comparison and confirmation is passed, the RFID reader will record the real time and further combine the real time with the read neutral RFID tag.

The real location of the read neutral RFID tag on the C & R box will be recorded and further combined with the read RFID tag by the RFID reader automatically or manually input when such box is being stacked onto the pallet. It is an important principle or rule but simple to follow: that the first box with the read neutral RFID tag is always and at all time stacked onto the C & R pallet 132 in the location of the upper-left 137 where marked with number 1 colored with green. While the last box 138 on each layer on the C & R pallet is always and all time located in the lower right where marked with number 3 colored with red 104. All other boxes on each layer will be stacked onto the C & R pallet by following the first box from the left to the right.

The real name of product with real item number in each C & R box can be pre-entered if all boxes packaged with the same product with the same item number on the same pallet or entered in live when each RFID tag being read as described in FIG. 11.

The neutral RFID tag, from the first to the fifth part (FIG. 11), combines with real time, real location, real name of product and real number to create a lifetime unique ID for such a C & R box for the product transfer. By way of example, the neutral RFID tag on the first box stacked on the first layer on the C & R pallet is recorded and can be viewed via a computer or other similar devices directly as: "BOXUSRRSF1234567899US01022010184848L1L1-Product name-xx". The universal, reusable and neutral tag on the box, BOXUSRRSF1234567899US, was read in Jan. 2, 2010 at 18:48:48 PM as recorded "01022010184848" and the C & R box was stacked on the C & R pallet 132 on first layer L1 and on the first location L1. The underlined part is the readable part of the neutral RFID tag.

The function of that the RFID reader can only read RFID tag data according to the pre-saved data by the RFID system supplier (FIGS. 3 and 23) via data comparison and data confirmation is the best way to protect privacy of all users. It is also the best but simple way to solve the problem that the RFID technology has been referred to as an invasive technology and to avoid all possible or potential lawsuits related to the RFID technology application.

In case, a neutral RFID tag, either on the C & R pallet or on any C & R box, is unreadable by the RFID reader for any reason, the readable part 103 on the C & R pallet or the readable part 123 on the C & R box can be manually input either by voice or by the keyboard or by a barcode scanner. The input RFID tag on the C & R box 1310 will be noted by the RFID reader automatically. The manually input RFID tag data will be automatically compared and confirmed with data pre-saved in the RFID reader by the RFID system supplier (FIG. 23). The confirmed RFID tag data will be further combined with the real time when the data was input, the real location data of such neutral RFID tag on the C & R box was stacked on the pallet, the real name of product and the real number of the product in the C & R box were entered to create a lifetime unique ID for such a box.

The unread neutral RFID tag by a RFID reader or the neutral RFID tag data being collected via voice or the keyboard or a barcode scanner will be tracked and securitized to find out what caused the neutral RFID tag to be unreadable when the C & R box or the C & R pallet with the unread neutral RFID tag is recollected in the RFID system supplier facility. The noted unread neutral RFID tag will be also used to remind the product receiver to pay an extra attention on such unread box for their business transaction.

In case, the RFID system has to stop working under extremely conditions, such as the RFID system is being an extraordinary complex environments or surroundings due to the location near the airport or other complex signal environments, no electrical supply, a disaster situation or a RFID reader or a barcode scanner or a computer system to be unavailable. It is a possible way to manually write down each readable part of ID on each RFID reader, RFID data carrier, each of neutral RFID tags on the pallets and boxes with real time, real location, and real product name with real item number in each box. All hand recorded data can be entered to a RFID reader or a RFID data carrier via data comparison, data confirmation and data combination at any time when a RFID reader or RFID data carrier is available to work. All data can be further transferred to data base or e-mail to the receiver and the RFID system supplier. All data recorded by hand and entered to RFID system can be used by all the receivers with RFID system or data control system for product and product data verification (FIG. 19) in the supply chain. This is a distinct advantage of the RFID system in present invention.

It should be emphasized that the neutral RFID tag data collection during the palletization procedure in a manufacture is charge-free, since the palletization is a necessary procedure for a manufacturer to move their product to their buyer or the end user via containerization or other similar way. There is only one step to follow: Always to stack the first box with the read neutral RFID tag onto the C & R pallet in the location where is marked with 1 colored with green, and all other boxes following the first one from the left to the right and the last box with a read RFID tag to be stacked onto the C & R pallet or each layer in the location where is marked with 3 colored with red at lower-right of each pallet. This special requirement will be meaningful, useful and convenient for further product and product data verification and further product conduct in the warehouse (FIGS. 16, 19, 20, 21A and 23).

The process of palletization is an opportunity and a way to confirm that the manufacturer has really received from the RFID system supplier (FIG. 23). Each read neutral RFID tag 121 on each C & R box 135 or each neutral RFID tag 102 on each C & R pallet 132 are compared singly with the data provided by the RFID system supplier (FIG. 23).

The well built pallet 139 is ready to be used for further business transaction. Don't move any built pallet till a pallet rack or location number in the warehouse has been issued to this pallet or shipping container number or a trailer number has been recorded, otherwise such a built pallet is easily misplaced or lost (EXHIBIT. 1) in the warehouse or somewhere within the facility (FIGS. 15A and 17).

FIG. 13A shows the front view of a built pallet. The boxes with same 3 dimensions (L×W×H) can be placed onto the C & R pallet at the same pattern from the first layer (L1) to the last layer (L4) on the pallet. 13A5 is the real location data L4L9 of a read neutral RFID tag with the C & R box on the built pallet. The readable part 103 of a neutral RFID tag 102 is printed on the C & R pallet. The readable part 123 of a neutral tag was printed on each side of the box.

FIG. 13A1 to FIG. 13A4 are the top view of each layer of the stacked boxes on the C & R pallet 132. 13A5 is the real location data L1L3 for the C & R box with the read neutral RFID tag that located on the first layer L1 on the third location L3. The first box 137 on the each layer on the C & R pallet is all time and always on the up-left numbered with 1 and the last box 138 with the read neutral RFID tag is all time and always stacked on the location numbered with 3 (FIG. 13) on the C & R pallet 132.

FIG. 13B shows the front view of the built pallet. The C & R box with different 3 dimensions (L×W×H) can be placed onto the C & R pallet at different patterns for each layer on the C & R pallet. 13A5 is the real location data of a read neutral RFID tag on the C & R box stacked onto the C & R pallet 132 on the $4^{th}$ layer and at the location 9. The readable part 103 of a neutral RFID tag 102 for the C & R pallet is printed on the C & R pallet. The readable part 123 of a neutral tag for C & R box was printed on each side of the box.

FIG. 13B1 and FIG. 13B2 are the top view of the first layer 13B1 and the second layer 13B2 on the pallet. 13A5 is the real location data L1L3 for the C & R box with a neutral RFID tag, of which indicates the C & R box with neutral RFID tag is located on the first layer L1 on the third location L3. The first box 137 on the each layer on the C & R pallet is all time and always on the up-left numbered with 1 and the last box 138 with neutral RFID tag is all time and always stacked on the location numbered with 3 on the C & R pallet 132.

FIG. 13C shows the front view of the built pallet. The C & R box with different 3 dimensions (L×W×H) can be placed onto the C & R pallet with the different patterns for each layer from the first layer L1 to the fourth layer L4 on the C & R pallet 132. The readable part 103 of a neutral RFID tag 102 is printed on the C & R pallet 132. The readable part 123 of a neutral RFID tag was printed on each side of the box.

FIG. 13C1 to FIG. 13C4 are the top view of the each layer of stacked boxes on the pallet. 13A5 is the real location data of a read neutral RFID tag with the C & R box on the built pallet. The first box 137 on the each layer on the C & R pallet 132 is all time and always on the up-left numbered with 1 and the last box 138 with neutral RFID tag is all time and always stacked on the location numbered with 3 on the C & R pallet 132.

FIG. 13A to FIG. 13C only are a few examples to show the way how to collect and identify the real location data of stacked boxes on the pallet. It is not a limitation to use the methods for all patterns beyond these few examples for the real location data collection and identification of C & R boxes with the neutral RFID tags on the C & R pallet. It is not a further limitation to use the real location data of a neutral RFID tag with a C & R box for products and product data verification and conducts in the supply chain management.

Figure 14:
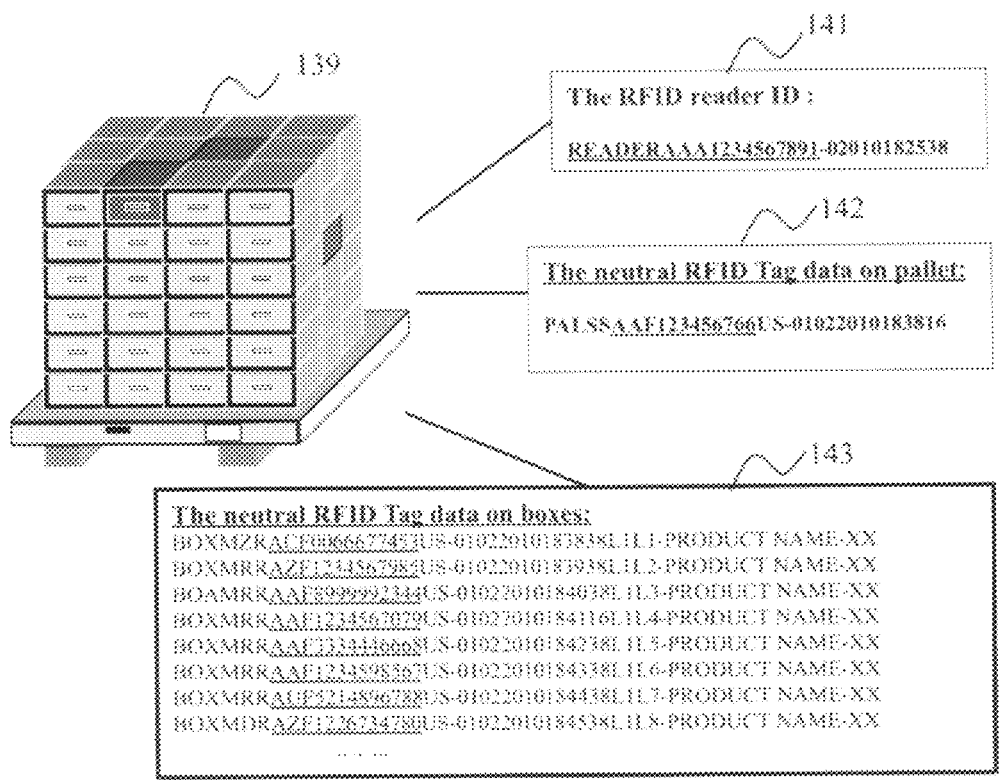

FIG. 14 is the combination of all collected data for a built pallet. Each read neutral RFID tag data on the C & R pallet 142 and each of all read neutral RFID tag data 143 on each of all C & R boxes on the C & R pallet will be combined with each other. The RFID reader ID 141 will combine with both the read neutral RFID tag data 143 on each of all C & R boxes and the read neutral RFID tag data 142 on the C & R pallet. Such combination makes each pallet, all stacked boxes on the C & R pallet and the RFID reader ID to share all data. As long as one RFID tag is read from a built pallet 139, all data related to this pallet will be available in full or partial as required, including the RFID reader ID data, the neutral RFID tag equipped pallet and each of all neutral RFID tags equipped on each of all boxes on this pallet. The underlined parts, 141, 142 and 143, are the readable part. The RFID reader ID provides real time location data for all combined data.

FIG. 15 shows a product transporting and keeping unit (PTK). The C & R box 137 is stacked on the C & R pallet on the 6$^{th}$ layer L6 with the location number L1 and the C & R box 138 is the last box stacked on the first layer L1 in the location marked with 3 colored with red 104. Any unreadable neutral RFID tag data 1310 on a C & R box or a C & R pallet, being input via voice or a keyboard or a barcode scanner, is noted by the RFID reader (FIG. 13). A built pallet 139 must be issued a pallet rack or location number 151 first before being allowed to move into the warehouse as a product transporting and keeping unit (PTK).

The term of a product transporting and keeping unit (PTK) is a built pallet 139 with the neutral RFID tag data 121 on each C & R box and the neutral RFID tag data 102 on the C & R pallet to combine with a pallet rack number or location number 151 in the warehouse as a product keeping unit, or to combine with the RFID tag data on a shipping container or trailer or the readable shipping container or trailer number as a product transporting unit (FIG. 17). All C & R boxes in a product transporting and keeping unit (PTK) can be the same product packaged in the same sized box or different products packaged in various sized boxes with no limitation. As we all know, there are only two places for a built pallet in the supply chain, either in a warehouse or in the shipping container or trailer or in a closed movement vehicle (airplane or train or truck). In either case, a product transporting or keeping unit (PTK) must have 3-dimension or multi-dimension data. All data of a product transporting and keeping unit (PTK) must be tracked able, countable, comparable, verifiable, locatable, transferable, universal able and universal acceptable in the supply chain and logistic management.

FIG. 15A shows the 3-D or multi-dimension data of a product transporting and keeping unit (PTK). The C & R pallet rack number or location number 151 in a warehouse, the neutral RFID tag on the C & R pallet 142 and the neutral RFID tag data on each of all C & R boxes 143 are 3-Dimension data for each product transporting and keeping unit (PTK) in a warehouse. The combined 3-D data enable precisely and accurately to locate any box on a pallet or any pallet in a warehouse.

The RFID reader ID 141 provides a real time and real time location data. When the real time and real time location data combine with 3-D data of a product transporting and keeping unit (PTK) or all data related to and combined with a product transporting and keeping unit (PTK), they are multi-dimension data. The multi-dimension data can provide both historical and real time location data for a product transporting and keeping unit (PTK).

FIG. 16 is the process the containerization. Containerization is the last point for a manufacturer to collect all data related to their product before moving to the market. Containerization is also the last point for a manufacturer to move their products with all collected product data (FIGS. 13 and 14) and product related information (FIG. 18) to the receivers.

The RFID reader 131 is used to read the RFID tag 161 on the shipping container or the trailer first or to input the readable container number 166 on the shipping container 164. The RFID reader 131 further checks each product transporting and keeping unit (PTK) 163 by reading any or some neutral RFID tags on any or some C & R boxes or the neutral RFID tag on the C & R pallet randomly and simultaneously, by comparing and confirming the read data with the collected data from the palletization as shown and described in FIGS. 13, 14, 15, 15A and FIG. 23. The RFID data carrier ID is created as afore-described in FIG. 6. Each confirmed product transporting and keeping unit (PTK) 163 is then loaded onto the container or the trailer.

All collected data will be combined with each other and transferred to the RFID data carrier 162, to the receiver, to the RFID system supplier, the government control system or any allowed parties directly by e-mail or any other way as required. All data will be further transferred to the database (FIG. 23) and shared with all involved parties. The RFID data carrier 162 will finally bound with the last pallet by using the belts as shown in FIGS. 7 and 8 before the container door is sealed. The RFID data carrier 162 can be also communicated wirelessly via the antenna 165 on the container for data review or data download or real time location of the shipping container with all products inside the container.

FIG. 17 shows the collected 3-D or multi-dimension data of a product transporting and keeping unit (PTK) during containerization. The RFID tag data on the shipping container or the trailer or the readable shipping container or trailer number data 172, the neutral RFID tag data on the C & R pallet 142 and all neutral RFID tags on each of all C & R boxes 143 on each pallet are 3-Dimension data for each product transporting and keeping unit (PTK) in each shipping container for product transportation. The combined 3-D data can precisely locate a box on a pallet or a pallet in a container or trailer as required by inventory control.

Both the RFID reader ID 141 and the RFID data carrier ID 171 provide a real time and real time location data, which can indicate when and where all data were collected, compared, confirmed and further combined with all data in each product transporting and keeping unit (PTK) in the original place (FIGS. 13 and 15A). The real time and real time location data from a RFID reader 141 and/or RFID data carrier 171 can be further verified by RFID system supplier (FIG. 23).

The real time data 173 is the time when a product transporting and keeping unit (PTK) is loaded onto the shipping container or a trailer. A countdown time data 174 is the total time needed from the original place to the destination.

All underlined parts in each of the boxes, 141, 142, 143, 171, 172, 173 and 174, are readable data. All readable data are able to be used for products and product data verification under the conditions and circumstances of a RFID system or a barcode scanner is unavailable (FIG. 19).

Figure 18:
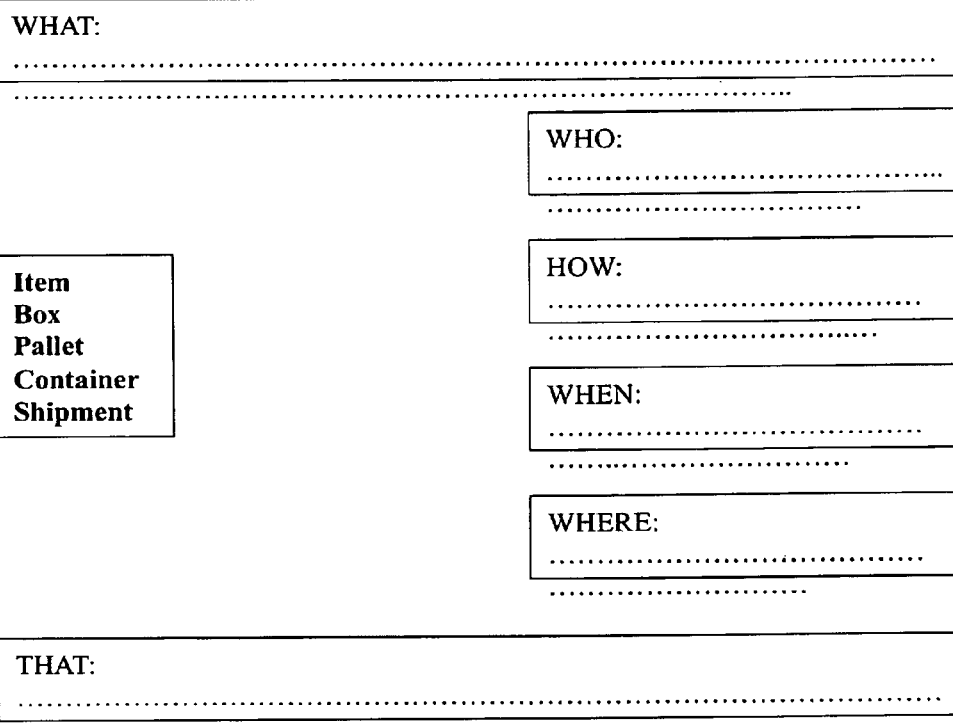

FIG. 18 is the product data and the product related information for each shipping container or trailer. The product data and products related information on each of all products at all levels, including item, box, pallet, container and shipment, and related to all involved parties, including but not limited, the container company, the truck company, the shipping company, the insurance carrier, the banks, the Customer agent and the receiver. Neutral information is also allowed for the purpose of further business transaction.

The product data and products related information entered by the manufacturer will economically and efficiently lower the cost for the receiver, the government control system and all involved parties, since all entered information can be reviewed, downloaded and ready to use or edit upon the receiver business operating requirement. All information entered by manufacturer can also efficiently avoid possible mistakes during the data reenter by the receiver or the related parties, since no one is better than the manufacturers in knowing their own products in the whole supply chain. All data should be as detailed as it can be by the manufacturer as following with no limitation:

What it is:
The manufacturer name and location, telephone number, fax numbers of associated entities, e-mail;
The supplier ID;
The Order number;
The Contract number;
The Bill of Lading number;
The invoice number;
The L/C number/bank draft number/bank transfer number or any other way for payment information;
The beneficiary name;
The bank name;
The ID number of the universal RFID reader; or
The ID number of the universal RFID data carrier;
The shipping container number (RFID tag data and the container number);
The sealing number for the shipping container if applicable;
The time for each product transporting and keeping unit (PTK) is being loaded to the shipping container;
The neutral RFID tag data on each product transporting and keeping unit (PTK);
The neutral RFID tag data on each of all boxes on a pallet and all pallets in a container;
The name of the product;
The barcode number;
The time of the product being processed;
The batch number;
The best date to sell;
The best date to use;
The best condition to be transported;
The best and optimal condition to store;
The item level package information, if applicable;
The C & R box level information, including but not limited, 3-d data of each box, gross weight and net weight;
The insurance company name and contact information;
The truck company name, the truck number and identity associated with the trucking company, driver ID number;
The shipper's name;
The original port name;
The destination port name;
And all other related information with no limitation.
Where it is
The location of the manufacturer;
The original port located;
The original products come from;
The destination port;
The receiver full address and phone number;
And all other related information with no limitation.
When it is or it Will be:
The product being processed;
The product being packaged;
The time to build the pallet;
The time to load the products into the container;
The time from the original supplier to the shipper (real time)
The time from the original supplier to the receiver in destination (countdown time);
And all other related time related information with no limitation.
Who it is
The manufacturer;
The shipper or carrier;
The receiver;
The insurance carrier;
And all other involved and related parties with no limitation.
How
How many items in each box;
How many boxes on each pallet;
How many pallets in a shipping container or a trailer;
How many containers for the same products in a shipment;
How many items or boxes or pallets or containers on this order;
How many products or boxes or pallets or containers for this order;
And all other related information with no limitation.
That (Result of Each Transaction)
The products are preparing or ready for ship;
The products are shipped or in shipping;
The products are in transaction;
The products are received;
The products are selling;
The products are in back order;
And all other related information with no limitation.

Same question being repeatedly asked in different ways in the product data or product related information is another way to confirm the entered data.

All information and data related to each of all products in the business transaction can be input as the requirement of various systems, such as WMS (warehouse management system), ERP (enterprise resource planning system), MHE (material handle equipment system) and PML (Physical Markup Language). All product data and related information can be entered by a neutral form if the products in a shipping container will pass through more than one business transactions or any other system or language as required by the receiver or the buyer or the related party. The product and product related information with collected RFID tag data saved in the RFID reader or the RFID data carrier will be shipped out or received with the product in each container at the same time.

Product and related data and information are used to verify the accuracy of the shipped or received products, since all data entered can be compared with any or all boxes in a product transporting and keeping unit (PTK) manually or automatically. By way of example, the product name, three dimension data of a box or pallet, the RFID reader ID data, the shipping container RFID tag data, shipping container number or the RFID data carrier ID can be crossly checked with the data collected from the palletization and containerization (FIGS. 13 and 17). Information and data entered in the form as shown in above must be consistent with the RFID reader ID data, the RFID data carrier ID data, the neutral RFID tag data on the C & R pallets and boxes, and the container RFID tag data or number, otherwise the system can easily refuse to save or transfer to database for further business transaction. To keep correct and accurate data and information conformity and consistence with product is the obligation and responsibility of the manufacturers.

FIG. 19 is the illustration of the verification methods for products and product data. The products and product data identification and verification can be actually performed at any time under conditions or circumstances with the RFID reader or a barcode scanner or without using a RFID reader or a barcode scanner for any reason by the following ways. The products and the product data verification methods are according to all data collected from each of the original places. The products and the product data comparison and verification can be automatically and manually processed by a RFID system or data control system or reviewed in person via a computer or similar devices in warehouse or any facility with no limitation as following:

a. Randomly and simultaneously reading fewer (≥1) neutral RFID tag (FIG. 11) on any or some boxes or RFID tag (FIG. 9) on the C & R pallet in a product transporting and keeping unit (PTK) by using an RFID reader, to particularly compare the read neutral RFID tag data (the first to the fifth part) (FIGS. 9 and 11) with the neutral RFID tag data collected from the original place (FIGS. 13, 14 and 17) downloaded from the RFID reader or the RFID data carrier or from the database or from the e-mail (FIGS. 13, 17 and FIG. 23). All confirmed data can be further verified with the neutral RFID tag data provided by the RFID system supplier (FIG. 23).

b. Randomly and simultaneously reading a fewer (≥1) neutral RFID tags (FIG. 11) on any or some boxes or RFID tag (FIG. 9) on the C & R pallet of a product transporting and keeping unit (PTK) by using an RFID reader, to particularly compare the read neutral RFID tag data with the downloaded RFID tag data and further to compare the RFID reader ID (the readable part) FIGS. 14 and 17 with the RFID reader ID (the readable part) from the RFID system supplier (FIG. 23).

c. Randomly and simultaneously reading fewer (≥1) neutral RFID tags (FIG. 11) on any or some boxes or neutral RFID tag (FIG. 9) on the C & R pallet of a product transporting and keeping unit (PTK) by using an RFID reader, to particularly compare the read neutral RFID tag data with the downloaded RFID tag data combined with RFID data carrier ID (FIG. 17) and the RFID data carrier ID from the RFID system supplier (FIG. 23). Particularly to compare the real time location data from the RFID data carrier (FIG. 17) with the delivered real time location data by the RFID data carrier (FIG. 23).

d. Randomly and simultaneously reading fewer (≥1) neutral RFID tags (FIG. 11) on any or some boxes or the neutral RFID tag (FIG. 9) on the C & R pallet of a product transporting and keeping unit (PTK) by using an RFID reader, to particularly compare the read neutral RFID tag data with the neutral RFID tag data collected from the original place (FIGS. 14, 17 and 23) which were combined with the shipping container RFID tag data or readable container or trailer number (FIGS. 16 and 17). Particularly to compare the container RFID tag data or readable container number from FIGS. 17 and 18 with the received shipping container number data.

e. Randomly collecting a fewer (≥1) readable part of a RFID tags (FIG. 11) on any or some boxes or the readable parts of the neutral RFID tag (FIG. 9) on the C & R pallet in a product transporting and keeping unit (PTK), to particularly compare the input readable RFID tag data with the data collected from the original place (FIGS. 13 and 23) downloaded from the RFID reader or the RFID data carrier or from database or from E-mail (FIGS. 13, 17 and 23).

f. Randomly collecting the real location data (FIG. 11) of any or some boxes (≥1) on the received product transporting and keeping unit (PTK), to particularly compare the real location data of the neutral RFID tag with box in a product transporting and keeping unit (PTK) with the data collected from the original place (FIGS. 13 and 17) downloaded from the RFID reader or the RFID data carrier or database or e-mail.

g. Randomly collecting the real time data of a fewer (≥1) neutral RFID tag data (FIG. 11) on any or some boxes (PTK) or the neutral RFID tag (FIG. 9) on the C & R pallet in the product transporting and keeping unit, to particularly compare the real time data with real time data on the RFID reader ID in the original place (FIG. 13) downloaded from RFID reader or RFID data carrier or from database or e-mail.

h. Randomly scanning fewer (≥1) barcodes (FIG. 12) on any or some boxes (≥1) or pallet (FIG. 10), to particularly compare the collected readable RFID tag data via barcode with the neutral RFID tag data collected from the original place (FIGS. 13, 17 and 23) downloaded from the RFID reader or the RFID data carrier or the database or the e-mail.

i. Randomly selecting fewer (≥1) RFID tag data from the downloaded data, to particularly compare the real location of the neutral RFID tag data with the real location of the received neutral RFID tag data on the C & R box in the transaction and stock keeping unit (TSK) (FIGS. 13 and 17).

j. Randomly selecting a fewer (≥1) RFID tag data (FIGS. 13, 14, and 17) downloaded from the RFID reader or the RFID data carrier or from the database or from the e-mail, to particularly compare with the data provided by the third party, the RFID system supplier (FIG. 23).

k. Randomly selecting any RFID tag data (≥1) collected from a to j, to particularly compare with the real time location information of the RFID reader (FIG. 13) with the real time location data to where all components were delivered by the RFID system supplier (FIG. 23).

l. Randomly selecting any RFID tag data (≥1) collected from a to k, to particularly compare with the real time location information of the RFID data carrier (FIG. 17) with the real time location data to where all components were delivered by the RFID system supplier (FIG. 23).

m. Randomly opening any and some boxes (≥1) on the product transporting and keeping unit (PTK), to particularly compare the real name and real item number with product name and the number data on the neutral RFID tag (FIGS. 13, 14 and 17) collected from the original place and downloaded from the RFID reader or the RFID data carrier or data downloaded from the database or from the e-mail.

n. Randomly and particularly compare any or some data (FIG. 18) entered by the manufacture with received products, such as the product name, the time to build a pallet, the name of the shipping container company.

o. Randomly selected the original purchase order amount or contracted amount or paid amount of products, to particularly compare with entered data by the manufacturer (FIG. 18) and with received amount of products.

p. Randomly select any RFID tag data (≥1), collected from a to o, to particularly compare with the C & R pallet rack or location number which combined with all RFID tags on all boxes and the C & R pallet in a transaction and stock keeping unit (PTK) in the warehouse (FIGS. 15, 15A and 21B).

q. Particularly compare the real time location data of the RFID data carrier (FIG. 17) where all data were transferred from a RFID reader with the real time location data of the RFID reader where the data were collected from the original place (FIGS. 13 and 23).

r. Particularly compare the real time data (FIG. 17) of the RFID data carrier when all data were transferred to with the real time when all components were delivered by the RFID system supplier (FIG. 23).

s. Particularly compare the readable part of the RFID data carrier ID or the RFID reader ID with the downloaded RFID data carrier ID or RFID reader ID set up from the original place (FIGS. 13, 17 and 23).

t. One by one checking each RFID tag data on each of all received boxes and pallets or one by one check each RFID tag data on each of used boxes and pallets in the final place (FIGS. 1, 2 and 23) to particularly compare with the RFID tag data saved in the data center which were downloaded from the database or from the e-mail.

u. One by one checking each collected RFID tag data (FIG. 23) on each of all boxes and pellets, each of the RFID reader ID (FIG. 13) or each of the RFID data carrier ID (FIG. 16) in each RFID system supplier (FIG. 23), to particularly compare all data with the originally delivered data on each of all components (FIG. 23) for each order.

v. In addition to above methods (a to u), any and all data collected and verified from each of all operation steps in the whole supply chain and logistics can be used for further product and product data comparison and verification in business transactions with no limitation.

Don't touch! Don't move! Don't depallet! Don't recount! Unless one or more or all data have been verified and proved with received products in a shipping container or a single C & R box in the product transporting and keeping unit (PTK) according to the above described identification and verification methods. The more confirmation and verification methods to be used for monitoring and cross-checking the data with received products in live, the less possibility for a box or a product transporting and keeping unit (PTK) to be ignored or missed or misplaced in the business operation (EXHIBIT. 1).

FIG. 20 is the processes of products and product data conduct for the receivers or the end users. A checking point set up by the receivers or the end users to confirm all arriving containers and further conduct.

The term and meaning of a checking point here is totally different from the checking point currently being set up nearby the main warehouse of both Wal-Mart and the Department of Defense (DOD) for the purpose to check if the RFID tags have being tagged on the boxes and the pallets by the product suppliers as they required.

The checking point in present invention is a functional place to confirm all arrived containers or trailers by using the verification methods described in FIG. 19. The checking point is aimed at to reduce the product flow amount pass through the warehouse, to simplify the inventory handling process and further to lower the cost of all operations in a warehouse:

1. The checking point can issue a delivery map to the truck driver to deliver products in a shipping container or trailer to the stores, chain stores or end user directly at box or layer levels or a product transporting and keeping unit (PTK) level (FIG. 17).

2. The checking point can send the arrived shipping containers with seasonal or slow moving products to a fully secured container parking place to wait for the right and proper delivery time to each store, each chain store or each end user directly at boxes, layers or pallets level. Each shipping container or trailer is able to serve as a temporary movable mini warehouse to keep products for further delivery as required. This will reduce the warehouse handling or keeping amount and further reduce warehouse cost in many ways as described above 3. The checking point can further issue an order to the driver to deliver the container or trailer with products to a warehouse for further products and product conduct at items, boxes or pallet levels.

FIG. 21A to 21D illustrates the conduct process of receiving and verifying all arrived product.

Figure 21A:
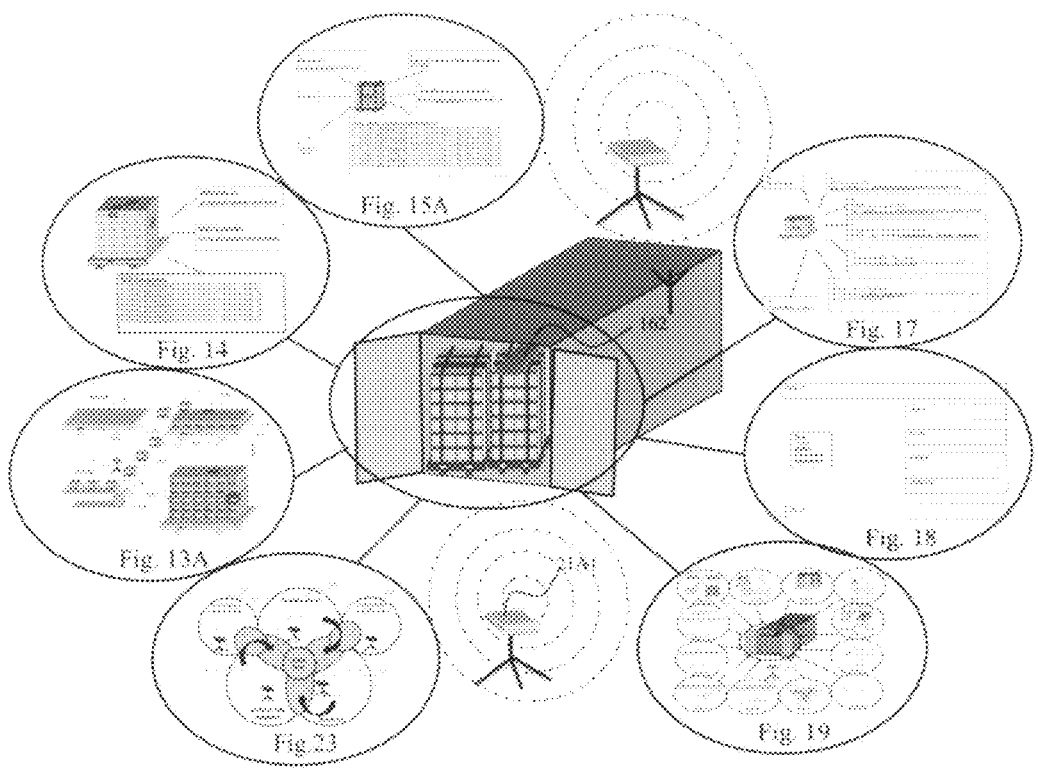
FIGS. 21A to 21D illustrates the conducts of products and product data in the product the receiver warehouse.
Figure 21B:
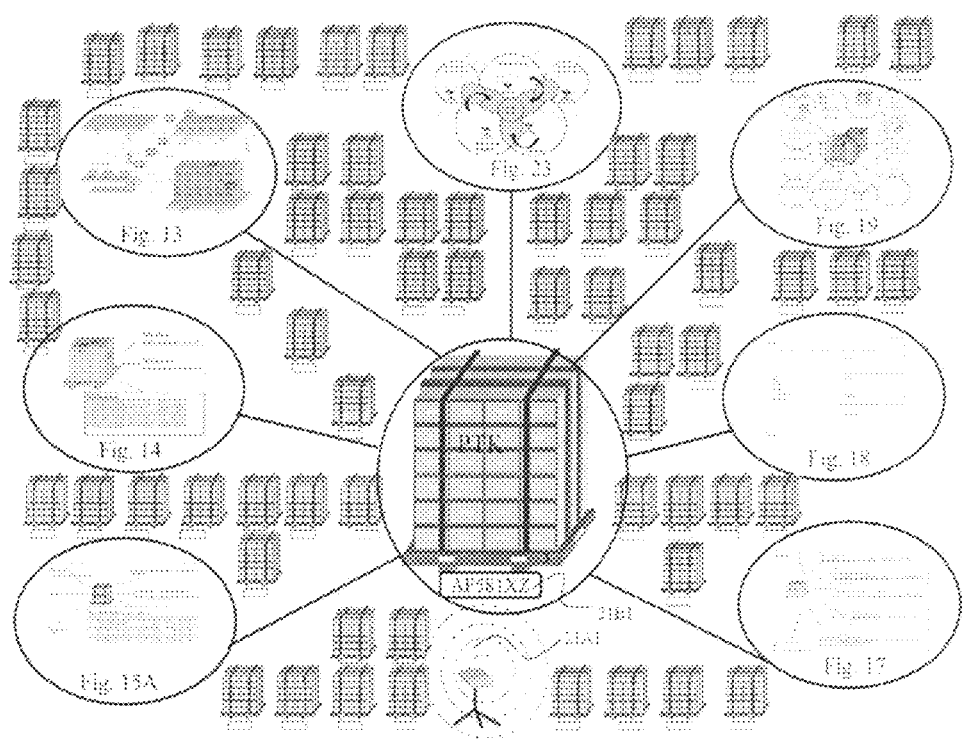

FIG. 21A is the processes of receiving and verifying a shipping container in a warehouse. All data carried by the RFID data carrier 162 can be previewed by a computer system or downloaded to a data control system by wire or wireless via USB or Ethernet or Wi-Fi or GSM system. In accordance with the downloaded data from the RFID data carrier, the data control system in a warehouse shall perform a data cross-checking with all afore collected or received data to verify the products and the product data as described in FIG. 19. The prerequisite for product verification at a container level is both the products and the product data to be received and verified at the same time.

Shipping container or trailer verification in the receiver warehouse is an important step for further products and product data in warehouse, since from this special point or converting point, all operating procedures in the warehouse or in the final place will be totally contrary in handling direction with the operation in a manufacturer as shown in FIGS. 1, 13 to 18.

FIG. 21B is the unloading process for each product transporting and keeping unit (PTK). The RFID reader 21A1 is used to verify and confirm each product transporting and keeping unit (PTK). Each of product transporting and keeping units (PTK) in a shipping container or trailer must be clearly verified by using any one or all methods described in FIG. 19 with the RFID reader 21A1 or a forklift carried RFID reader or a handheld RFID reader or a barcode scanner or manually by using the readable data. It is a key issue to compare the read or input RFID tag data on the received pallet or boxes with all historical and primeval data collected from the original places as showed in FIGS. 13, 14, 17, 18 and 23. A pallet rack number or location number 21B1 is issued to each verified and confirmed product transporting and keeping unit (PTK). No product transporting and keeping unit (PTK) or any single box or item is allowed to be moved into warehouse without a pallet rack number or location number being issued to (EXHIBIT. 1). The product transporting and keeping unit (PTK) moved to the location in the warehouse must be exactly the same as the issued pallet rack number or location number 21B1.

It must be clarified that any movement of a verified product transporting and keeping unit (PTK) or a box in the warehouse must be combined with a number related to the movement. For instance, a verified product transporting and keeping unit (PTK) is being unloaded from the verified shipping container to the warehouse by a forklift. The verified data of the product transporting and keeping unit (PTK), including the neutral RFID tag data on the C & R pallet and each of all RFID tag data on each of C & R boxes on the pallet, must be combined with the forklift number or the forklift driver ID or the forklift carried RFID reader ID or the handheld RFID reader ID or the barcode scanner ID, even such combination can only last or valid for a few seconds to a few minutes. A verified product transporting and keeping unit (PTK), for example, is being moved out from the keeping area 21B1 to the shipping area for outbound shipment. During the course of such movement, the forklift ID must be combined with the verified product transporting and keeping unit (PTK) and a location number in the outbound shipment waiting area must be issued to this pallet. All these simple rules enable a warehouse to control real time and real time location of all products at all levels in the warehouse (Exhibit 1).

Figure 21C:
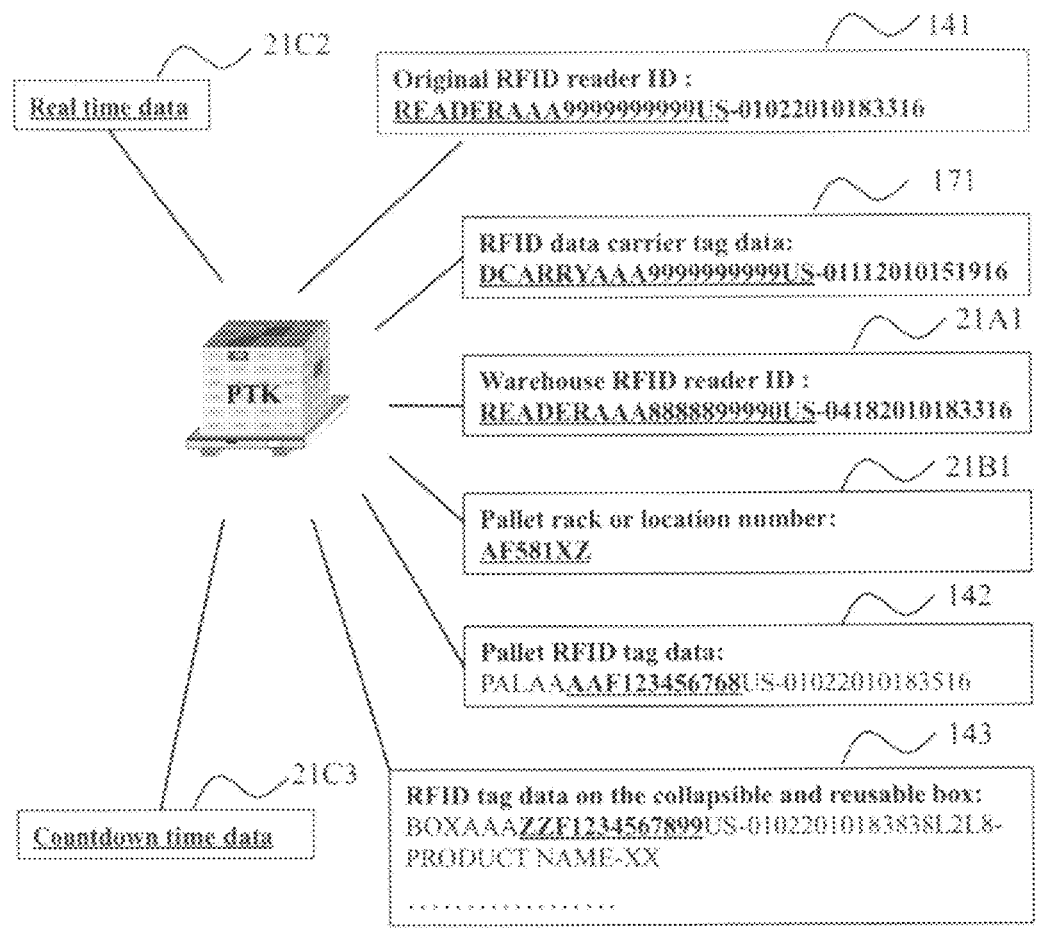

FIG. 21C shows the 3-D or multi-dimension data for a product transport and keeping unit (PTK) in the warehouse. The pallet rack or location number 21B1, the neutral RFID tag data on the C & R pallet 142 and all neutral RFID tags on each of all C & R boxes 143 are 3-Dimension data for each product transporting and keeping unit (PTK) in the warehouse. The combined 3-D data enable to precisely locate a box on a pallet or a pallet in the warehouse at any time.

The RFID reader ID 141 and RFID data carrier ID 171 provide the real time and real time location data, which can reveal and indicate when and where all data related to the products were historically collected, compared, confirmed and further combined with each product transporting and keeping unit (PTK) with detailed RFID tag data (FIG. 14). The real time and real time location data from a RFID reader 141 and/or RFID data carrier 171 can be further verified by the RFID system supplier (FIG. 23).

The real time 21C2 is the time when a product transporting and keeping unit (PTK) was moved into the C & R pallet rack or location number 21B1 in the warehouse. A countdown time 21C3 is the total time scheduled to keep the product transporting and keeping unit (PTK) in the warehouse, which will be a help for inventory control in the warehouse.

The underlined part of each data in boxes of 141, 142, 143, 171, 21A1, 21B1, 21C2 and 21C3 are readable part. All readable data can be used for products and product data verification by using methods described in FIG. 19 under all conditions and circumstances as afore described in FIG. 13 during data collection for business transactions and warehouse operations.

It must be a rigorously restrictive principle or rule or regulation for a warehouse management and inventory control that an item or a box or a product transporting and keeping unit (PTK) must be all time and always with 3-demension data in the warehouse. This will keep a warehouse to be free of "black holes" caused by overcrowded and unorganized various products and, as a direct result of any of these "black holes", the products are mostly "missed" in these "black holes". As described in FIG. 15 and FIG. 15A, A product transporting and keeping unit (PTK) must be traceable, countable, comparable, confirmable, locatable, transferable, universal able and universal acceptable, either in a warehouse kept as stock (COMBINED WITH PALLET RACK NUMBER or PALLET LOCATION NUMBER) or in a shipping container or a trailer for product transportation (COMBINED WITH SHIPPING CONTAINER OR TRAILER RFID TAG DATA or THE READABLE SHIPPING CONTAINER NUMBER).

Figure 21D:
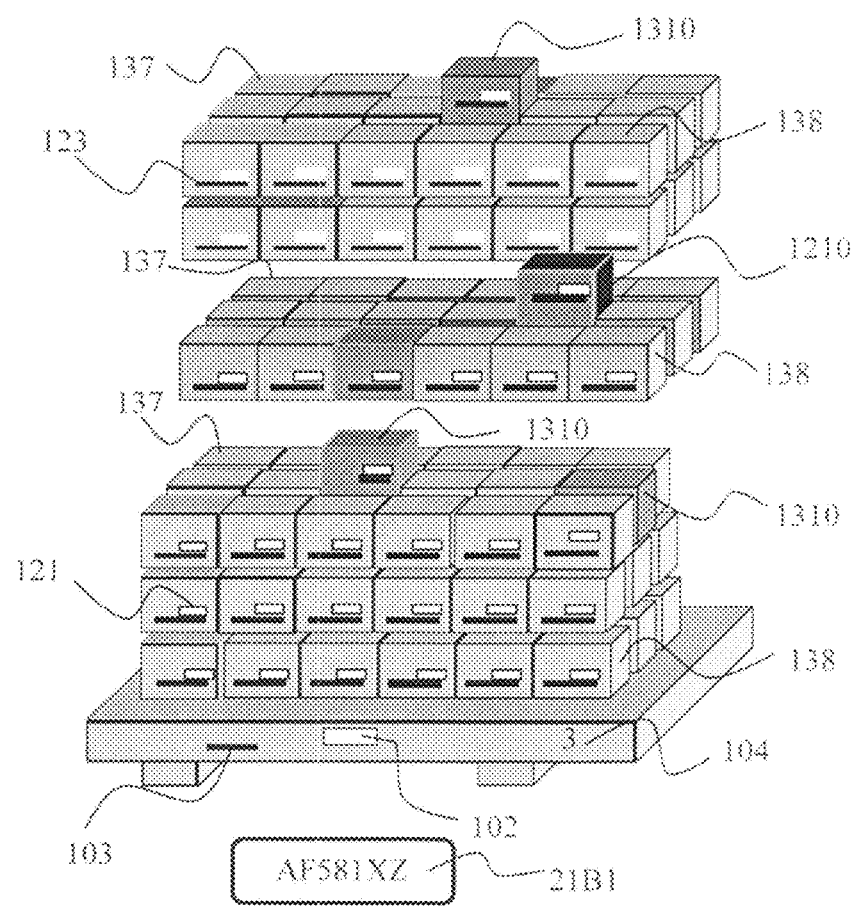

FIG. 21D illustrates 3-D or multi-dimensions of inventory control in a warehouse. The neutral RFID tag 102 on the pallet; each of all RFID tags 121 on the built pallet and the C & R pallet rack number or location number 21B1 are basic and important data for set up 3-D data and 3-D management in the data control center of the warehouse. These three data can set up 3-D view by the control system for inventory controller to distribute and dispose products for further transaction. Three dimension or multi-dimension data enable the control system to monitor and locate any single box or a product transporting and keeping unit (PTK) via inventory control system.

The inventory control system in a warehouse can monitor and track product at box, layer or a pallet level at real time and real time location (FIGS. 13, 15A, 17, 18, 19, and 23). 3-D and multi-dimension data control system can identify not only the neutral RFID tag of the C & R pallet or any box on the pallet, but also can identify the real location where the whole pallet is located in the warehouse and where is the single box located on the pallet. Even in the case, a neutral RFID tag is unreadable; the 3-D data system can still identify its real location 1310. Only this character, it is an invaluable for inventory control in a warehouse.

Figure 22:
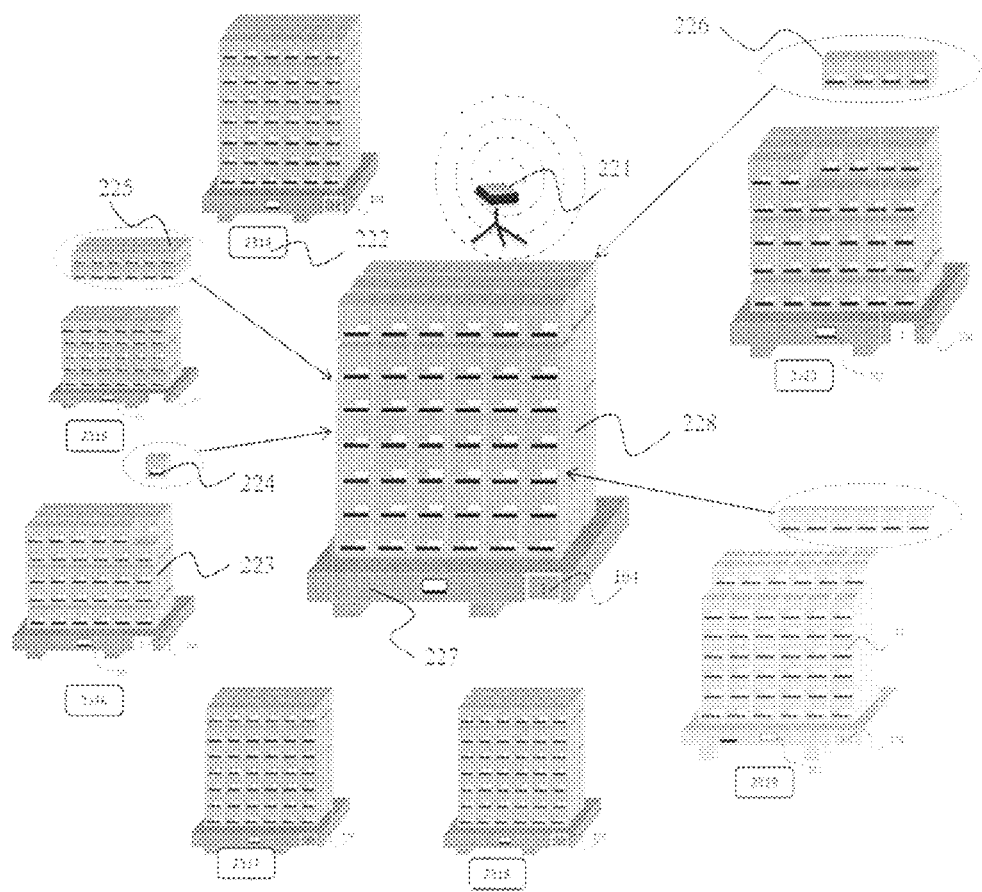
FIG. 22 illuminates the processes of a new pallet building for each business order in the warehouse.

FIG. 22 illuminates the processes of a new pallet building in the warehouse. Each product transporting and keeping units (PTK) 223 moved out from the original place in the warehouse must be issued with a new location number 222 in the C & R pallet building area. Products can be moved as one box 224 or fewer boxes 226 or a whole layer 225 from each of different product transporting and keeping units (PTK) to build a new pallet 228 according to the order. Except data collection, data comparison and data confirmation as afore described in FIG. 13, the data transference is a key issue during the new pallet building. For any moved boxes 224, 226 or layer 225 from the each of the product transporting and keeping unit (PTK) to the new pallet 227, the data must be transferred at the same time to the building pallet and followed by the data combination. The 3-D control system enables the whole process to be monitored and verified via the RFID reader 221, and further to reach 100% accuracy for the built pallet 228.

FIG. 23 demonstrates the operation of the RFID system supplier in the supply chain and logistics management. The RFID system supplier 236 is linked with each of manufacturers 233 and the product receivers 235 with delivered RFID system to the users according to the requirement, including RFID reader, RFID data carrier, and neutral RFID tags equipped C & R pallets and neutral RFID tags equipped C & R boxes. In the same time, the RFID system supplier will further provide 100% accuracy data for each of all delivered components. The government control systems 231 and 234 can use any or all methods (FIG. 19) to confirm the imported or exported product(s), of which must be consistent and accurate with each declaration made by the RFID system supplier 236, the product manufacturer 233 and the product receiver 235. The database 232 enables all involved parties to track and monitor their products and the RFID system movement. The overlaps, between the RFID system supplier 236 and the manufacturer 233 or the government control system 231 or between the manufacturer 233 and the product receiver 235 or the government control system 234 and the product receiver 235, are the places to deliver or to receive either the components of RFIS system with data only or both the components of RFID system and the products with data.

The RFID system supplier 236 all time and always prepares each component of the RFID system according to the order from a user by reading each RFID tag on each C & R pallet and box, each RFID reader ID and each RFID data carrier ID data. It is not allowed to input readable part or to use a barcode scanner for order preparation in the RFID system supplier facility. It is the responsibility of the RFID system supplier to guarantee that there won't have any same readable part of a neutral RFID tag in the delivered pallets or boxes for the same customer with various sized pallets or boxes. Each data related to each component is contrast able for data collection, data comparison and data confirmation, such as RFID reader ID, RFID data carrier ID, neutral RFID tag for each of all pallets and neutral RFID tag for each of all boxes.

The pre-saved data of all components is a "data filter" used by the information module (FIG. 3) to filter out all unrelated RFID tag data from the RFID reader. By using the pre-saved data as a "data filter", the RFID reader can only read the neutral RFID tag matched with pre-saved tag data. All unmatched or inconsistent RFID tags will be treated as unreadable and further be automatically blocked from the RFID reader. This distinct advantage is a way to protect all RFID system users' privacy during using RFID reader to collect RFID tag data. All RFID tags tagged on equipments, on raw materials, on processed products or on products packaged for different receivers are unreadable and un-recordable by the RFID reader.

The universal and reusable the RFID system supplier 236 is a professional, independent and neutral party in the whole supply chain.

As we all know, RFID is a special and complex technology. It needs special and experienced specialists and experts with RFID, RF communication, material science, IT, supply chain management and knowledge and techniques to handle all practical and potential problems involved with neutral RFID tag data reading, RFID reader workability in various complex environments. All recovered components of the RFID system need to pass through technical calibrating, examining, inspecting and testing to guarantee each of outbound components to be workable for further application. For neutral RFID tag equipped C & R pallet and box, it needs well trained or skilled people to handle and check each of them to guarantee all pallet and box to be functional well for product movement. To sort all collected components of the RFID system is a routing process for system supplier 236. Sorting processes include the cleaning, checking, calibrating, data deleting from used RFID reader or RFID data carrier. The whole processes, in fact, are fine example and model of RFID technology application for all users in the whole supply chain.

The RFID system supplier 236 is an independent enterprise to supply all components of RFID system as required to all users with full data for product movement. All data from the RFID system supplier must be consistent with the data collected from the product manufacturer (FIGS. 14, 17 and 18), of which must be confirmable and verifiable by the product receiver by using any or all methods described in FIG. 19.

As a neutralized enterprise, the RFID system supplier 236 must keep from all manufacturers or commercial activities, except to provide the RFID system in accordance with the order from each of customers. The neutral enterprise means that the RFID system supplier 236 has nothing to do with the product quality and product quantity in each of all boxes. The RFID system supplier has the obligation to keep all data regarding to each of products, each of the manufacturers, each of the receivers and each of all related data and information from any irrelevant party.

A "bank-like system" is used to supply the whole RFID system and collect all used RFID system for further application. The most distinctly differential of a bank-like system from the current bank system is that the bank-like system knows the real time location of each ID or RFID tag data with each individual component. The bank-like system further enable to know each individual and total amount of components in ordering, in delivering, in using or in waiting for collection at any time (FIGS. 13, 15A, 17, 18, 19, 21A and 2C). By contrast, the bank system knows each amount of money belong to each account holder, each transferring activity and each beneficiary via each of all relevant transaction banks, but no bank knows each serial number of all transferred money on each bill. For example, each bill, such as each of 1, 2, 5, 10, 20, 50 or 100 dollar, has a unique number and no one using the unique number when the bill is used, because there is no background or firsthand data to compare with and further no way to verify each bill by the unique number. So the serial number on each bill has no any function for money transaction between users or a customer and bank or between bank and bank.

The manufacturer 233 has an opportunity to confirm what they have received from the RFID system supplier 236 at item level from data collection during the palletization and containerization (FIGS. 13 and 16), since each individual component of the RFID system has its function related to data and products movement. The product receiver 235 not only receives product at the contracted amount from the manufacturer 233, and also receives full or partial RFID system from the RFID system supplier 236 via the manufacturer 233. The total received amount of RFID tag equipped C & R pallets, boxes and the RFID reader or the RFID data carrier in the receiver's facility must match with the manufacturer 233 and the RFID system supplier 236. The transparent and consistent data from both the RFID system supplier 236 and the manufacturer 233 are significant help for the product receiver to verify all inbound products (FIG. 19). Each overlap area is the area for real time location data collection (FIGS. 13, 17, 19, 20 and 23).

As shown in FIG. 23, there are at least three independent parties, the system supplier 236, the manufacturer 233 and the receiver(s) 235, which are involved in product movement via data collection, confirmation and combination and product verification. All data relevant to all products are no longer to be one-sided or unilateral one. This will largely change the situation of the restless recounting used in the current supply chain for inventory control, since the product receiver 235 will receive all data at the same time with transferred products and all data with received products can be verified by using methods described in FIGS. 19, 20 and 21A to 21D, of which can be verified by all involved parties 231, 233, 234 and 236.

All components of the RFID system are only for rent and not for sale. All using or used components of the RFID system are payable for each time use, compensation for any damaged components during business transaction and further are recollect able for further application. All parties involved in using the RFID system have to care each of all components handling, which result the better protection for products throughout the whole supply chain. The whole RFID system is transferable and tractable with products in the whole supply chain. Bank-like system allows all or partial components of the RFID system from the RFID system supplier to be transferable to the manufacturers, the receivers or an individual customer with either credit or third party guarantee or cash deposit within the certain time period. The transferable components of the RFID system are only used for product transporting and stock keeping with charge. This will guarantee all components to be recollected within the time period for each time of use.

Bank-like system allows all used components of the RFID system to be conveniently and efficiently collected, since the RFID system supplier knows the location and total amount for each individual component. The "bank-like" system accepts any individual or partial and all components of the RFID system returned from all users, including stores, warehouses, distribution centers, or individual customers. No matter the returned items are partial or in full, the "bank-like" system is able to clear the user's account, return the deposit if applicable and provide real time information on the balance of each of all user's account. For individual customer, the "bank-like" system can cash back the deposit for returning used box(s) or pallet(s). The data of each of all components obtained from the original RFID system supplier 236, the manufacturer 233 and the receiver 235 will support this "Bank-like" system to operate at the most efficient and convenient way for the whole system supply and recollection. The location of a RFID system supplier for the recovery of used system can be reasonably and conveniently distributed and set up according to the location and the amount of retailers and the end users in each area. It is highly possible for an empty shipping container or trailer to collect any or partial or all used components from the users (EXHIBITS. 5).

It is obvious that the present invention is an environment friendly system used for product movement. In addition, the present system can be reused repeatedly as long as each component functional well with no limitation. The whole system can practically and economically solved so many problems involved in the international trade, such as unbalanced trade between developed countries and developing countries, inefficient and ineffective product transfer, extremely high cost of inventory control due to the restless recounting, astonishing materials and energy waste and more. By way of example, the recovery and recollection of the RFID system can practically solve these headache problems for empty shipping containers or trailers movement for reuse, such as to move all RFID tag equipped C & R pallets and boxes for further application with these emptied containers. One can imagine how much it will save from the empty container or trailer transportation if most of empty containers are used to transport all components of the present system as afore quoted from the report of U.S. Department of Transportation in 2008 (EXHIBITS. 5).

Figure 24:
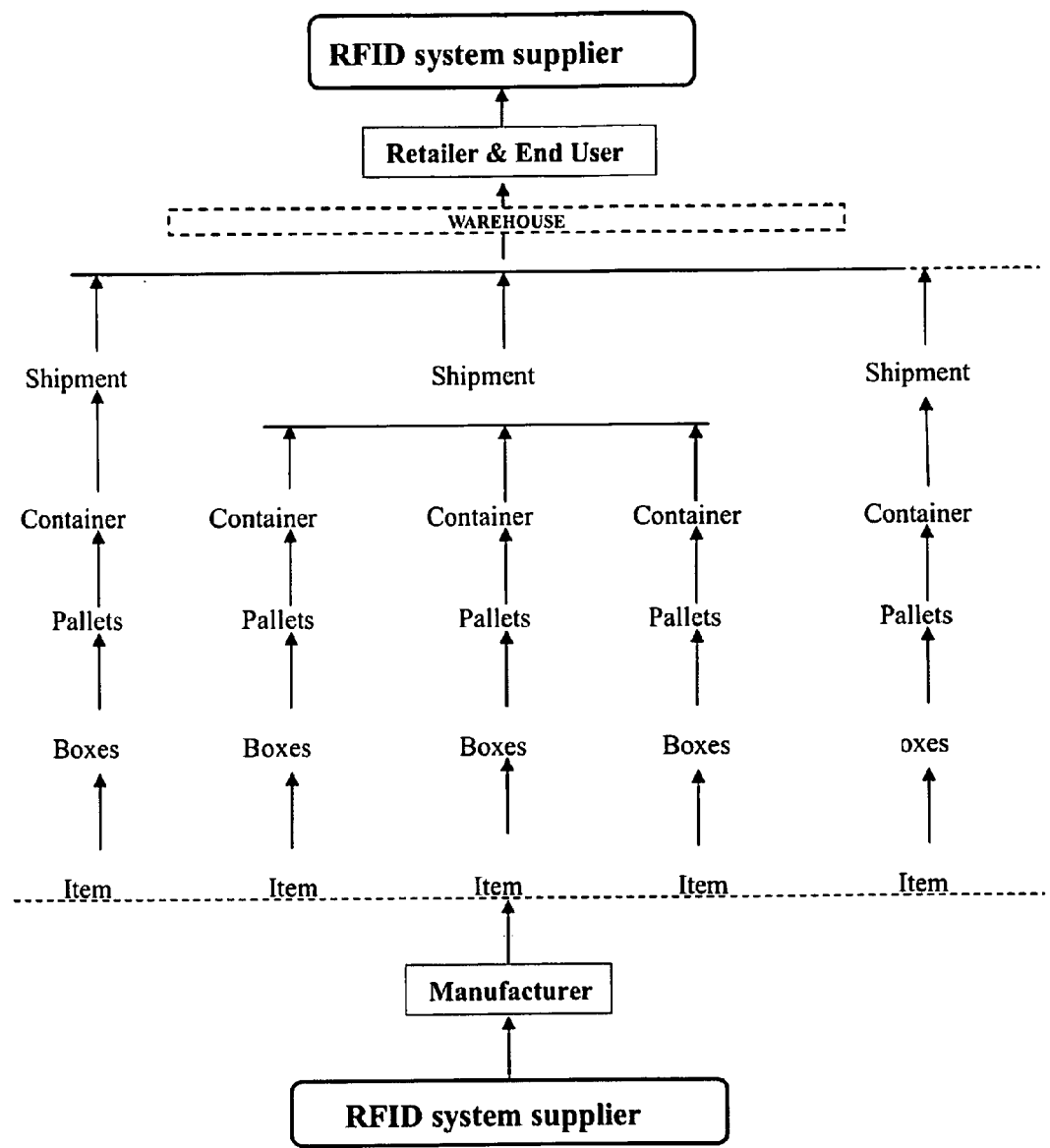
FIG. 24 shows the "family tree" information used to track the product movement for manufacturer, the receiver and the RFID system supplier.

FIG. 24 shows the "family tree" information used to track product movement for manufacturer, the receiver and The RFID system supplier. The "family tree", in fact, is set up by using all information and data collected from each original place, like the manufacturer (FIGS. 13 and 16), the receiver or the end user (FIGS. 20 and 23) and the RFID system supplier (FIG. 23) for all components and products delivered. The "family tree" provides the possibility for each involved parties to track their property for their interesting. For example, the "family tree" provides an efficiently and accurately data for the RFID system supplier to collect all used components of RFID system for further reapplication.

Method for use the universal and reusable RFID system for product transactions and inventory control in the supply chain management can be summarized: DATA COLLECTION, DATA COMPARISON, DATA CONFIRMATION and DATA COMBINATION. All methods afore-described can be further used for RFID technology developments and researches for all purposes.

The invention of the universal and reusable RFID system and the method for use in supply chain and logistics management have been described by preferred embodiment. It is not intended to limit the scope of the invention to the particular form set forth, but on the contrary, it is intended to cover such alternatives, modifications, and equivalents as may be included within the spirit and scope of the invention as defined by the appended claims.

Still other objects, features, and attendant advantages of the present invention will become apparent to those skilled in the art from a reading of the above detailed description of embodiments constructed in accordance therewith, taken in conjunction with the accompanying drawings.

It will be appreciated by those skilled in the art that Universal and Reusable RFID System and Method for Use can be embodied in other specific forms without changing from the essential characteristics and designs. It shall be point out that the present invention provides a way for RFID tag data collection at 100% accuracy, a way to protect privacy of all users for RFID technology application and all historical data can be easily verified. All data collected by using both the RFID system and method can be further used to develop any software or any new software for all purposes. The scope of the present invention described by the foregoing includes all changes that come within the meaning, range and equivalence thereof and is intended to be embraced therein.

What is claimed is:

1. A universal and reusable RFID system comprising:
a universal and reusable RFID interrogator (RFID reader) with a changeable RFID reader unique identification number, wherein the changeable RFID reader unique identification number is created each time when the RFID reader is used for data collection, comparison, confirmation and combination;
a universal and reusable RFID data carrier (RFID data carrier) with a changeable RFID data carrier unique identification number, wherein the changeable RFID data carrier unique identification number is created each time when the RFID data carrier is used for carrying collected RFID tag data, product data and product related information;
a first universal, reusable and neutral RFID tag (first neutral RFID tag) for a collapsible and reusable pallet (C & R pallet); and
a second universal, reusable and neutral RFID (second neutral RFID tag) for a collapsible and reusable box (C& R box);
wherein the changeable RFID reader unique identification number comprises five alphanumeric parts, wherein the first part, the second part, the third part and the fourth part are permanent and unchangeable;
wherein the first part of the changeable RFID reader unique identification number is represented by letters of "READER";
wherein the second part of the changeable RFID reader unique identification number is a manufacturer or an owner code, of the RFID reader, represented by a set of triplet letters ranging from A to Z, in a country;
wherein the third part of the changeable RFID reader unique identification number is represented by digital serial number processed from the manufacturer or the owner, of the RFID reader;
wherein the fourth part of the changeable RFID reader unique identification number is a country code represented by a set of two letters ranging from A to Z;
wherein the fifth part of the changeable RFID reader unique identification number is a real time, wherein the real time is determined at said each time the RFID reader is used for said data collection, comparison, confirmation and combination; wherein the real time is represented by date and time; the date is represented by Month (MM), Date (DD) and Year (YYYY); and the time is represented by Hours (HH), Minutes (MM) and Seconds (SS);
wherein the RFID reader combines the real time with the first part to the fourth part to create the changeable RFID reader unique identification number, every time the RFID reader transmits a read request to the RFID data carrier, first neutral RFID tag and the second neutral RFID tag;
wherein the changeable RFID data carrier unique identification number comprises five alphanumeric parts, wherein the first part, the second part, the third part and the fourth part are permanent and unchangeable;

wherein the first part of the changeable RFID data carrier unique identification number is represented by letters of "DCARRY";

wherein the second part of the changeable RFID data carrier unique identification number is a manufacturer or an owner code, of the RFID data carrier, represented by a set of triplet letters ranging from A to Z, in a country;

wherein the third part of the changeable RFID data carrier unique identification number is represented by digital serial number processed from the manufacturer or the owner, of the RFID data carrier;

wherein the fourth part of the changeable RFID data carrier unique identification number is a country code represented by a set of two letters ranging from A to Z;

wherein the fifth part of the changeable RFID data carrier unique identification number is a real time, wherein the real time is determined at said each time the RFID data carrier is used for said carrying collected RFID tag data, product data and product related information; wherein the real time includes date and time; the date is represented by Month (MM), Date (DD), Year (YYYY); and the time is represented by Hours (HH), Minutes (MM) and Seconds (SS);

wherein the RFID data carrier combines the real time with the first part to the fourth part to create the changeable RFID data carrier unique identification number, every time the RFID data carrier responds to the read request from the RFID reader.

2. The universal and reusable RFID system of claim 1, wherein the RFID reader further comprising a GPS, GLONASS, GALILEO POSITIONING, CHINESE COMPASS NAVIGATION SYSTEM and GSM supported information module.

3. The universal and reusable RFID system of claim 2, wherein the information module enables the RFID reader to only read said neutral RFID tag on said C&R pallet and on said C&R box matched with a pre-saved said first and second neutral RFID tags.

4. The universal and reusable RFID system of claim 1, wherein the RFID reader further comprising a radio frequency (RF) and channel selection module.

5. The universal and reusable RFID system of claim 1, wherein the RFID reader further comprising a set of RF transceivers.

6. The universal and reusable RFID system of claim 1, wherein the RFID reader further comprising a speaker module.

7. The universal and reusable RFID system of claim 1, wherein the RFID reader further comprising a counter module.

8. The universal and reusable RFID system of claim 1, wherein the RFID reader and the RFID data carrier further comprising a pair of belts and an anti-collision net on outside surface.

9. The universal and reusable RFID system of claim 1, wherein the RFID data carrier further comprising a GPS, GLONASS GALILEO POSITIONING, CHINESE COMPASS NAVIGATION SYSTEM and GSM supported information module.

10. The universal and reusable RFID system of claim 1, wherein the first neutral RFID tag for said C&R pallet comprises a changeable first neutral RFID tag identification number, wherein the changeable first neutral RFID tag identification number comprises five alphanumeric parts, wherein the first part, the second part, the third part, the fourth part and the fifth part are permanent and unchangeable;

wherein the first part of the changeable first neutral RFID tag unique identification number is represented by letters of "PAL";

wherein the second part of the changeable first neutral RFID tag unique identification number is a three dimensions data of said C&R pallet represented by a set of duplex letters ranging from A to Z in duplicates;

wherein the third part of the changeable first neutral RFID tag unique identification number is a manufacturer or an owner code, of the C&R pallet, with an application limitation of the said C&R pallet represented by a set of triplet letters ranging from A to Z, in a country;

wherein the fourth part of the changeable first neutral RFID tag unique identification number is a series of serial numbers represented by nine decimal numbers from 0 to 9 for said C&R pallet processed from the manufacturer or the owner, of the first neutral RFID tag;

wherein the fifth part of the changeable first neutral RFID tag unique identification number is a country code represented by a set of two letters ranging from A to Z.

11. The universal and reusable RFID system of claim 10, wherein the first neutral RFID tag is further combining the first part to the fifth part of the changeable first neutral RFID tag unique identification number with a real time data to create the changeable first neutral RFID tag identification number.

12. The universal and reusable RFID system of claim 10, wherein the third part and the fourth part of the changeable first neutral RFID unique identification number are printed, in a human readable form, on four side planes of the C&R pallet.

13. The universal and reusable RFID system of claim 12, wherein the readable parts are further expressed by a barcode printed under the readable parts on the four side planes of the C&R pallet.

14. The universal and reusable RFID system of claim 10, wherein the second part and the fifth part of the changeable first neutral RFID tag unique identification number are printed on all parts of the C&R pallet.

15. The universal and reusable RFID system of claim 1, wherein the first neutral RFID tag equipped C&R pallet further comprising two odd numbers 1 and 3, wherein the 1 is colored with green on the upper left side plane of the C&R pallet and the 3 is colored with red on the opposite lower right side plane of the C&R pallet.

16. The universal and reusable RFID system of claim 1, wherein the second neutral RFID tag for said C&R box comprises a changeable second neutral RFID tag identification number, wherein the changeable second neutral RFID tag identification number comprises five alphanumeric parts, wherein the first part, the second part, the third part, the fourth part and the fifth part are permanent and unchangeable;

wherein the first part of the changeable second neutral RFID tag unique identification number is represented by letters of "BOX";

wherein the second part of the changeable second neutral RFID tag unique identification number is a three dimensional data of said C&R box represented by a set of triplet letters ranging from A to Z;

wherein the third part of the changeable second neutral RFID tag unique identification number is a manufacturer or an owner code, of the C&R box, with an application limitation of the said C&R box represented by a set of triplet letters ranging from A to Z, in a country;

wherein the fourth part of the changeable second neutral RFID tag unique identification number is a series of serial numbers represented by nine decimal numbers from 0 to 9 for said C&R box processed from the manufacturer or the owner, of the first neutral RFID tag;

wherein the fifth part of the changeable second neutral RFID tag unique identification number is a country code represented by a set of two letters ranging from A to Z.

17. The universal and reusable RFID system of claim 16, wherein the second neutral RFID tag further is combining the first part to the fifth part of the changeable second neutral RFID tag unique identification number with a real time data, a real location data, a real product name data and a real item number data to create the changeable second neutral RFID tag identification number for the C&R box.

18. The universal and reusable RFID system of claim 16, wherein the third part and the fourth part of the changeable second neutral RFID unique identification number are printed, in a human readable form, on the four side planes of the C&R box.

19. The universal and reusable RFID system of claim 18, wherein the readable parts are further expressed by a barcode printed under the readable parts on the four side planes of the C&R box.

20. The universal and reusable RFID system of claim 16, wherein the second part and the fifth part of the changeable second neutral RFID tag unique identification number is printed on all parts of the C&R box.

* * * * *